(12) United States Patent
Ooe et al.

(10) Patent No.: US 7,346,973 B2
(45) Date of Patent: Mar. 25, 2008

(54) PROCESSING CELL OF AUTOMATIC MACHINING SYSTEM AND AUTOMATIC HONING SYSTEM

(75) Inventors: Hiroyuki Ooe, Kyoto (JP); Toru Fujimura, Kyoto (JP); Kazuhiko Tsuji, Kyoto (JP); Yasuo Tomita, Kyoto (JP)

(73) Assignee: Nissin Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/642,169

(22) Filed: Aug. 18, 2003

(65) Prior Publication Data

US 2004/0109734 A1    Jun. 10, 2004

(30) Foreign Application Priority Data

Sep. 9, 2002    (JP)    ............................... 2002-263358

(51) Int. Cl.
   B23B 39/16    (2006.01)
   B23Q 39/04    (2006.01)

(52) U.S. Cl. .............................. 29/563; 29/564; 408/2; 408/3; 408/25; 408/44; 408/70; 451/5; 451/11; 451/27; 700/169

(58) Field of Classification Search .................... 408/2, 408/3, 25, 43, 44, 70; 29/563, 564, 33 P; 451/5, 11, 27; 700/112, 114, 115, 116, 169, 700/186, 196
   See application file for complete search history.

(56) References Cited

U.S. PATENT DOCUMENTS

| | | | | |
|---|---|---|---|---|
| 2,870,577 A | * | 1/1959 | Seborg | 451/155 |
| 3,576,540 A | * | 4/1971 | Fair et al. | 700/9 |
| 3,909,922 A | * | 10/1975 | Takasaki et al. | 29/563 |
| 3,952,388 A | * | 4/1976 | Hasegawa et al. | 29/33 P |
| 4,187,644 A | * | 2/1980 | Fitzpatrick | 451/151 |
| 4,257,103 A | * | 3/1981 | Suzuki et al. | 700/169 |
| 4,424,569 A | * | 1/1984 | Imazeki et al. | 700/169 |
| 4,473,883 A | * | 9/1984 | Yoshida et al. | 700/179 |
| 4,580,207 A | * | 4/1986 | Arai et al. | 700/169 |
| 4,887,221 A | * | 12/1989 | Davis et al. | 700/181 |
| 4,945,685 A | * | 8/1990 | Kajitani et al. | 451/27 |
| 4,962,583 A | * | 10/1990 | Yang | 483/32 |
| 4,976,025 A | * | 12/1990 | Aldridge et al. | 29/563 |
| 5,177,904 A | * | 1/1993 | Nagel et al. | 451/27 |
| 5,305,556 A | * | 4/1994 | Kopp et al. | 451/165 |
| 5,608,902 A | * | 3/1997 | Iijima | 707/200 |
| 5,625,561 A | * | 4/1997 | Kato et al. | 700/193 |

(Continued)

Primary Examiner—Monica Carter
Assistant Examiner—Michael W. Talbot
(74) Attorney, Agent, or Firm—Cheng Law Group PLLC

(57) ABSTRACT

A processing cell of automatic machining system configured in that it is easy to decide or change the number of steps and to design, and to reduce the installation cost. The control unit of the processing cell comprises an operation data storing means for storing every position necessary data for operation at each position of the processing cell installed in the machining section of the automatic machining system, and a position designating means for designating the after-installation position. The control unit reads necessary data for operation out of the operation data storing means in accordance with the position designated by the position designating means. Thus, the operation of each cell can be switched in accordance with the position, and the processing cells can be easily changed in position and adjusted in quantity.

21 Claims, 36 Drawing Sheets

U.S. PATENT DOCUMENTS

| | | | |
|---|---|---|---|
| 6,609,042 B1 * | 8/2003 | Kumeth | 700/116 |
| 6,708,385 B1 * | 3/2004 | Lemelson | 29/563 |
| 6,780,084 B2 * | 8/2004 | Moellenberg et al. | 451/5 |
| 6,920,678 B2 * | 7/2005 | Ooe et al. | 29/563 |
| 2002/0184746 A1 * | 12/2002 | Kusmierczyk et al. | 29/33 P |
| 2003/0145449 A1 * | 8/2003 | Lutz | 29/564 |
| 2004/0211051 A1 * | 10/2004 | Gass | 29/564 |

* cited by examiner

FIG. 26

|   | | B | A1 | A2 | A3 | C |
|---|---|---|----|----|----|---|
| a | Discrimination data (up) | 0 | 10 | 20 | 30 | * |
| b | Collation data (up) | * | 0 | 10 | 20 | 30 |
| c | Judgment data (down) | 5 | 15 | 25 | 35 | * |
| d | Discrimination data (down) | * | 5 | 15 | 25 | 35 |

PROCESSING CELL OF AUTOMATIC MACHINING SYSTEM AND AUTOMATIC HONING SYSTEM

BACKGROUND OF THE INVENTION

1. Field of the Invention

The present invention relates to processing cells of automatic machining system and an automatic honing system, and more particularly, for example, to automatic machining techniques such as automatic honing executed on sub-machined work sequentially carried at predetermined intervals along a work carrying passage for sequentially continuous machining by means of a boring machine and a honing machine disposed halfway in the work carrying passage.

2. Description of the Related Art

For example, honing is available as one of machining methods for accurately finishing work bore surfaces. In honing, a honing tool and work are placed in a state of relatively floating, then the honing tool is given rotational and reciprocal motion, and the work bore surfaces are accurately finished while expanding the grindstone of the honing tool by means of a wedge or cone.

Recently, as a device for efficiently honing work bore surfaces as mass-produced products such as the bore surfaces of automobile parts, there has been developed an automatic honing system which comprises a plurality of honing machines arranged in a row for executing sequentially continuous honing on work carried at predetermined intervals.

An automatic honing machine of this type is, for example, as shown in FIG. 36, is configured in that a work carrying passage a is disposed in loop form, and in the work carrying passage a are arranged work loading section b, work machining section c, and work unloading section d.

And, at the work loading section b, work W lined up and fed by the work feeder e such as a parts feeder is fitted on honing jig g being in a standby condition at disposing position P of the work carrying passage a by means of robot unit f. The honing jig g with work W fitted and held thereon is brought by loader h to the position of under-bore detector i, and the under-bore diameter of the machining hole of work W is detected by the under-bore detector i.

Subsequently, at the work machining section c, the honing jig g with work W held thereon is transferred in tact fashion by transfer unit j to rough honing machine k --> first measuring device 1 --> middle honing machine m --> second measuring device n --> finish honing machine o --> third measuring device p, and is also positioned at the position of each unit, and thereby, specified honing steps are sequentially automatically executed.

In this way, work W with honing completed at the work machining section c is cleaned by brush unit q, and thereafter, the work is delivered to the disposing position P by means of unloading unit r, feedback unit s and push-in unit t of the work unloading section d, and again, the work is sorted by the robot unit f of the work loading unit b in accordance with the result of measurement of the third measuring device p, and thereby, non-defectives are delivered to non-defective unloading chute u, and defectives are unloaded into NG chute v.

This automatic honing system is designed as an exclusive machine specialized according to the shape and size of specific work W to be machined and its machining conditions, and all components a, b, c, d are securely integrally installed on a large frame (not shown) and are driven by control unit x which controls the whole system all together.

However, such a system configuration designed as an exclusive machine for specific work W involves various problems mentioned in the following.

(1) The number of honing steps is determined in accordance with the under-bore shape accuracy, cutting margin and required shape accuracy of work W, but the under-bore shape accuracy and cutting margin at the stage of trial are unstable.

Accordingly, in such a configuration that all components a, b, c, d are securely integrally installed on a large frame and that the whole system is controlled all together by one control unit x, the number of steps cannot be determined until coming to the final stage.

(2) For the same reasons, in case the under-bore accuracy of work W is changed or the machining accuracy required for work W is changed, the number of steps cannot be determined.

(3) Also, for the same reasons, when the prediction of the production quantity of work W is difficult, it is accompanied by difficulty in making the decision on investment.

(4) Because of being designed as an exclusive machine for specific work W, when there is no need of production of the specific work W, it is necessary for machining other work different in shape, size and machining conditions to remodel the mechanical configuration of the whole system. Also, in case such remodeling is impossible, the system itself has to be discarded, resulting in increase of the installation cost.

(5) Since the system structure of each component a, b, c, d is configured as one system as a whole, the common system for each component unit such as a hydraulic unit being a driving source for each component unit and a cutting oil tank used in machining operation is to be relatively large in size and separately installed, and as a result, the whole system becomes complicated and larger in size, causing the installation cost to be increased.

Most of these problems are common to automatic machining systems including the automatic honing system which executes sequentially continuous machining of work such as various mechanical parts as mass-produced products by means of a plurality of machine tools arranged in a row.

BRIEF SUMMARY OF THE INVENTION

The main object of the present invention is to provide novel processing cells of automatic machining system and an automatic honing system which are capable of solving such conventional problems.

Another object of the present invention is to provide a processing cell of automatic machining system which is small-sized, light-weight, and structurally simplified, easy of deciding or changing the number of steps and of designing, and moreover, capable of reducing the installation cost.

Also, further another object of the present invention is to provide an automatic honing system equipped with a plurality of the processing cells.

The processing cell of automatic machining system of the present invention is configured in that works are continuously carried at predetermined intervals along a work carrying passage and there are provided machining sections of the automatic machining system which perform sequentially continuous machining of the works, and it is of unit structure at least including a carrying device forming a part of the work carrying passage, a single machine tool, and a control unit which controls these in mutually interlocked fashion. And the processing cells are quantity-adjustably installed in the machining section of the automatic machining system, and the control unit is provided with an operation data storing means for storing necessary data for operation at each position of the cells installed in the machining section, and a position designating means for designating the after-installation position, and the control unit, after being installed in the machining section of the automatic machining system, reads the data necessary for the operation out of the operation data storing means in accordance with the position designated by the position designating means.

As a preferable example of execution, the data stored in the operation data storing means are, for example, discrimination data added to a packet at the sending side and collation data used for collating the discrimination data at the receiving side, for the purpose of 1 to 1 correspondence between the sending side and the receiving side, when the control unit makes packet communication with other part of the machining section by using communication means. The data necessary for operation at each position of the machining section are stored every position.

The discrimination data and collation data are usually numeric value data, but the data are sometimes character codes.

In the case of numeric value data, common up information and down information are set in numeric value, and the up information or the down information is added to the discrimination data in execution of data transfer, and thereby, one discrimination data can be jointly used for up-going and down-going communication.

Also, in the case of numeric value data, the discrimination data and collation data for each position can be represented as a functional value of which the position number designated by the position designating means is a variable.

The above position designating means can be configured by using a numeric value inputting means such as a digital switch. Besides this, numbering can be automatically executed by utilizing a method of establishing packet communication with a loop-form communication line. This becomes possible when each control unit is provided with a function such that the numeric value stored in the number portion is taken in as its position designating number on receiving a packet having a numbering instruction and number portion, and a predetermined value is added to the number portion and transferred to the next stage.

The contents of transfer data for packet communication with use of the discrimination data and collation data are the work machining sizes after machining on a machine tool which are measured by a measuring device, and the results of their judgment made by a comparative computing means. The work machining size after machining is used for the follow-up investigation of machining record at each honing position in particular. The results of judgment are the results of measurement with respect to a plurality of measuring positions of work which are represented, for example, by showing the non-defectives and defectives classified by tolerance such as +NG, ++OK, +OK, OK, −OK, −−OK, −NG. The results of judgment on non-defectives and defectives are sent to the next honing machine and used for its control.

The operation program of the machine tool can be mentioned as another example of data necessary for the operation at each position stored in the operation data storing means. In a honing system equipped with a plurality of honing machines, the contents of the operation program are different because the honing machine operation is higher in precision at the later stage than at the earlier stage. In order to cope with this, a plurality of operation programs are stored in a operation data storing means, and after being installed in the machining section of the system, the necessary program is read out of the operation data storing means in accordance with the position designated by the position designating means.

Also, the automatic honing system of the present invention is configured in that sequentially continuous honing is executed on work carried at predetermined intervals along the work carrying passage by means of a plurality of honing machines arranged halfway in the work carrying passage for carrying the work, wherein the honing section for honing the work comprises at least honing cells for honing-the work quantity-adjustably connected, and the plurality of honing cells are mutually interlocked and controlled. And the honing cell is of unit structure at least including a carrying device forming a part of the work carrying passage, a single honing machine, and a control unit for controlling these in mutually interlocked fashion, and the control unit of the honing cell is provided with an operation data storing means storing the data necessary for operation at each position of the cells installed in the honing section and with a position designating means for designating the after-installation position, and the control unit operates according to the operation data read out of the operation data storing means in accordance with the position designated by the position designating means.

In an automatic machining system provided with processing cells of the present invention, for example, in an automatic honing system, the processing cells are quantity-adjustably arranged to configure the honing section. The system is compact, light-weight and structurally simplified, and easy of deciding or changing the number of steps and of designing, and moreover, capable of reducing the installation cost.

Particularly, the control unit of the machining cell comprises an operation data storing means storing the data necessary for operation at each position of the cells installed in the honing section and a position designating means for designating the after-installation position, and after the processing cells are installed in the honing section, the control unit operates according to the operation data read out of the operation data storing means in accordance with the position designated by the position designating means, and thereby, the operation of each processing cell is switched in accordance with the arrangement and able to cope with the positional change and the quantity change of the processing cells.

The above and other related purposes and features of the present invention will be clearly understood by reading the detailed description based on the attached drawings and the novel items pointed out in the claims.

BRIEF DESCRIPTION OF THE DRAWING

FIG. 26 shows a configuration example in which one combination of discrimination data and collation data registered in a data table is designated by a digital switch and used at the control unit of the cell.

DETAILED DESCRIPTION OF THE PREFERRED EMBODIMENT

Figure 1:
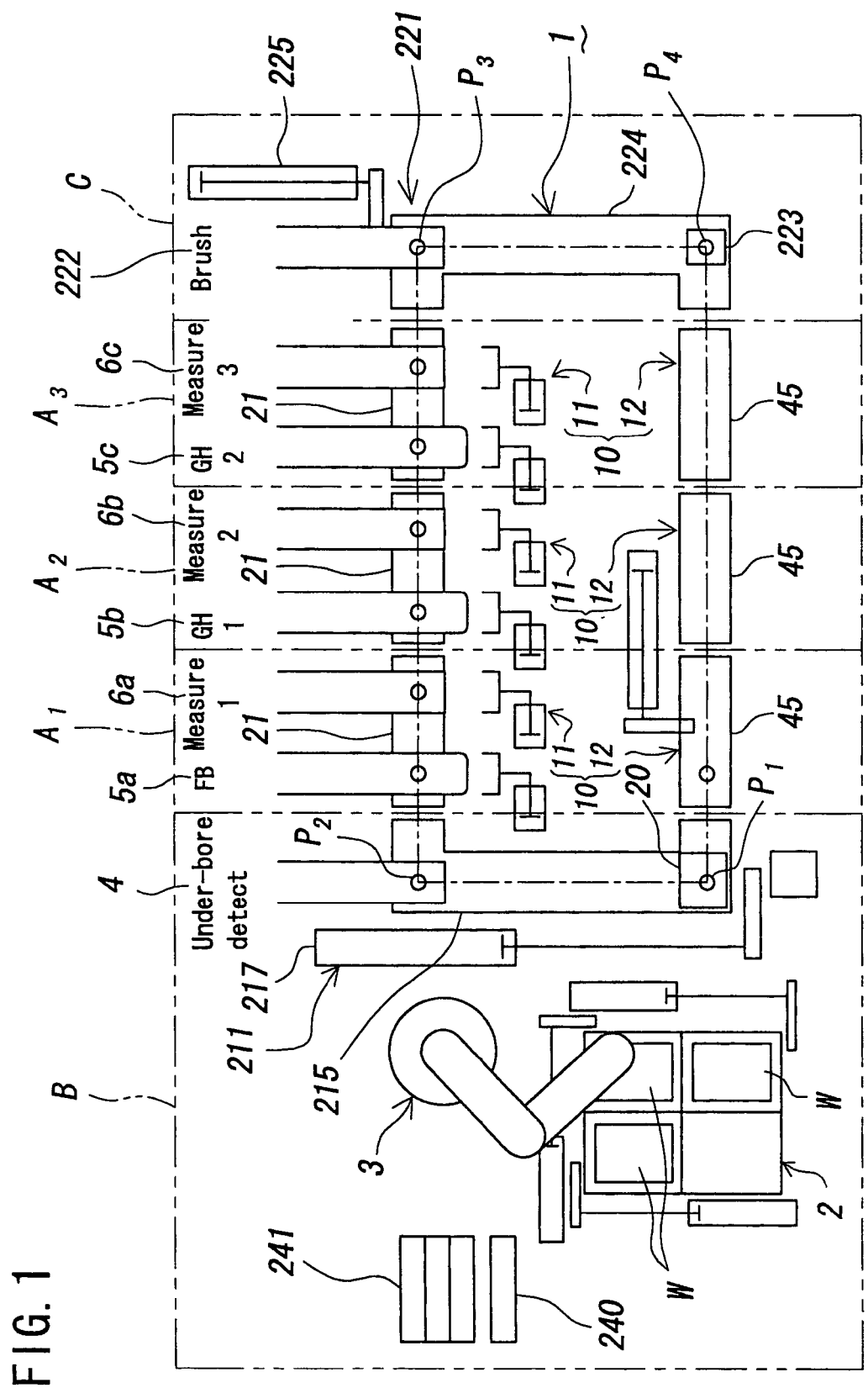
FIG. 1 is a plan view showing the general configuration of an automatic honing system in one preferred embodiment of the present invention.

The preferred embodiment of the present invention will be described in the following with reference to the drawings.

An automatic honing system of the present invention is shown in FIG. 1 to FIG. 35, and same reference numerals used in all the drawings stand for same component members or elements.

The automatic honing system of the present invention is shown in FIG. 1, and in the system, work W, W . . . . are continuously carried at predetermined intervals along work carrying passage 1, and sequentially continuous honing is executed on the work W, W, . . . .

In the above automatic honing system, specifically, loading cell B and unloading cell C are arranged in series fashion at either side of a plurality (three units in the figure) of processing cells or machining cells A1, A2, A3 which are of unit structure.

The automatic honing system with these machining cells A1, A2, A3, B, C has a configuration including main components such as the work carrying passage 1, work feeding device 2, work loading/unloading robot 3, under-bore detector 4, boring machine (precision boring machine for precision boring in the figure) 5a for boring, first measuring device 6a for precision boring, first honing machine 5b for middle machining, second measuring device 6b for middle machining, second honing machine 5c for finishing, and third measuring device 6c for finishing which are disposed in loop form.

The machining cells A1, A2, A3 make up the honing section of the honing system, each of which has same basic mechanical structure adjustably installed in the honing section. Specific configurations of machining cell A1 provided with precision boring machine 5a are shown in FIG. 2 to FIG. 14, and also, specific configurations of machining cells A2, A3 provided with honing machine 5b or 5c are shown in FIG. 15 to FIG. 22, FIG. 13 and FIG. 14. Specific configurations of machining cell A1 and machining cells A2, A3 will be described in the following.

The machining cell A1 provided with precision boring machine 5a is of unit structure including carrying device 10 forming a part of the work carrying passage 1, single precision boring machine (machine tool) 5 (5a), measuring device 6 (6a), and control unit 7 (7a) for controlling these in mutually interlocked fashion, as shown in FIG. 2 to FIG. 14.

The carrying device 10 comprises carrying section 11 for carrying work W to be machined and feedback section 12 for carrying the work W after machining.

Figure 3:
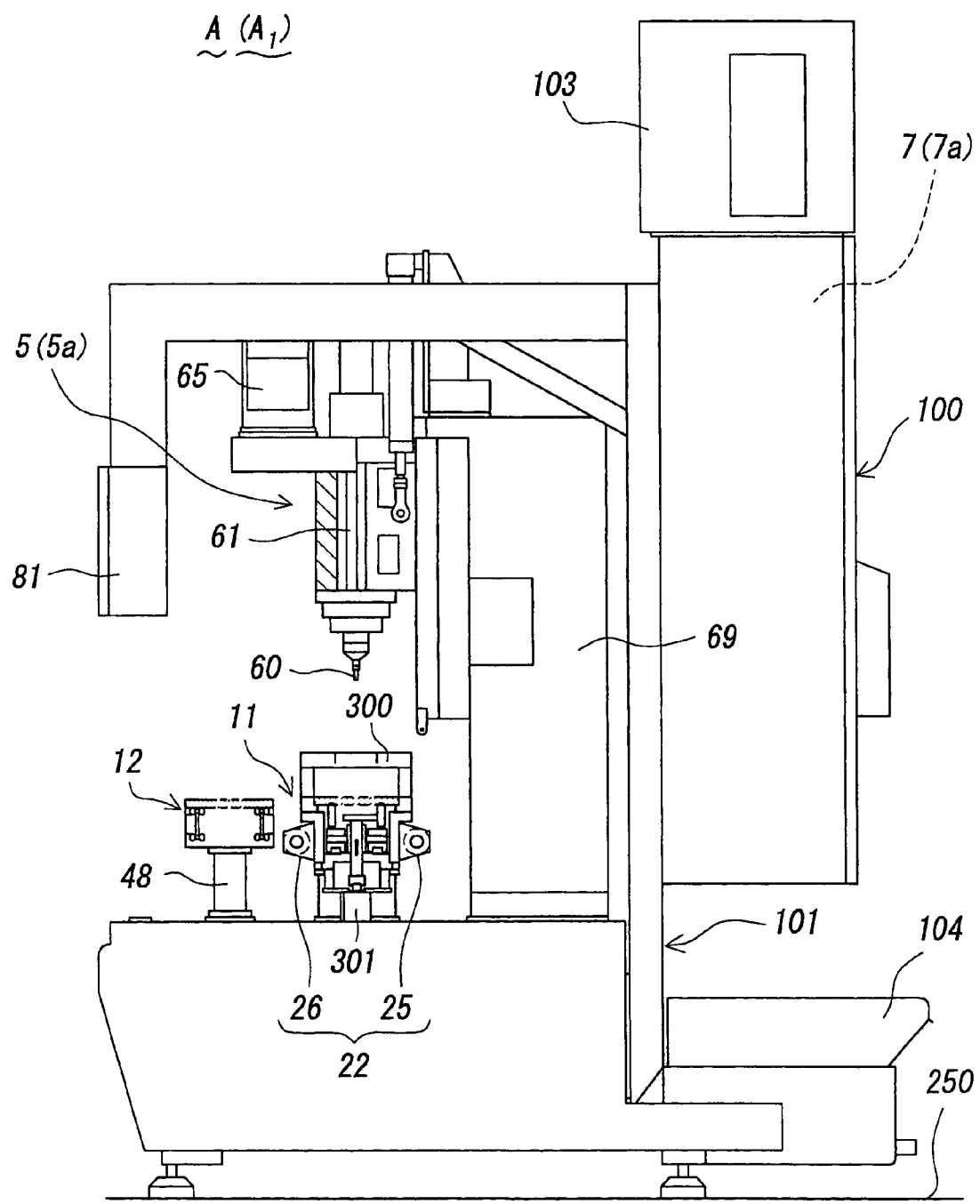
FIG. 3 is a side view showing the machining cell.

The carrying section 11 comprises carrying rail 21, work moving device (work moving means) 22, and positioning device (positioning means) 23 as shown in FIG. 4 to FIG. 7, which is configured so as to pass under the precision boring machine 5a and measuring device 6a and is disposed on carrying section base 24, as shown in FIG. 3. The carrying rail 21 and feedback rail 45 forming the carrying sectional also functions as the reference position of the machining cell A1 and are also structurally able to change the normal and reverse directions of flow of the work W as described later.

Figure 4:
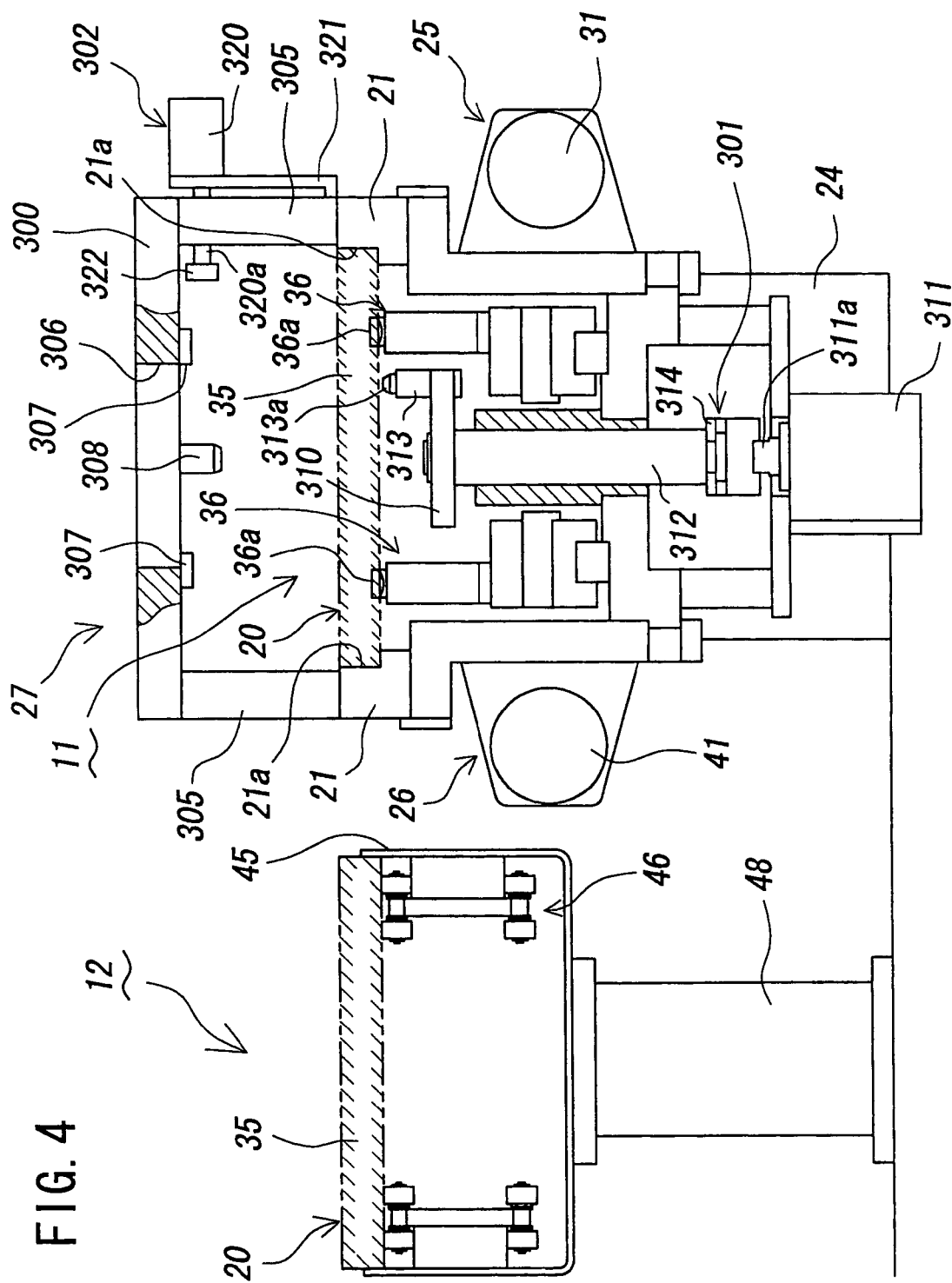
FIG. 4 is a side view showing the enlarged lower part of the machining cell.
Figure 5:
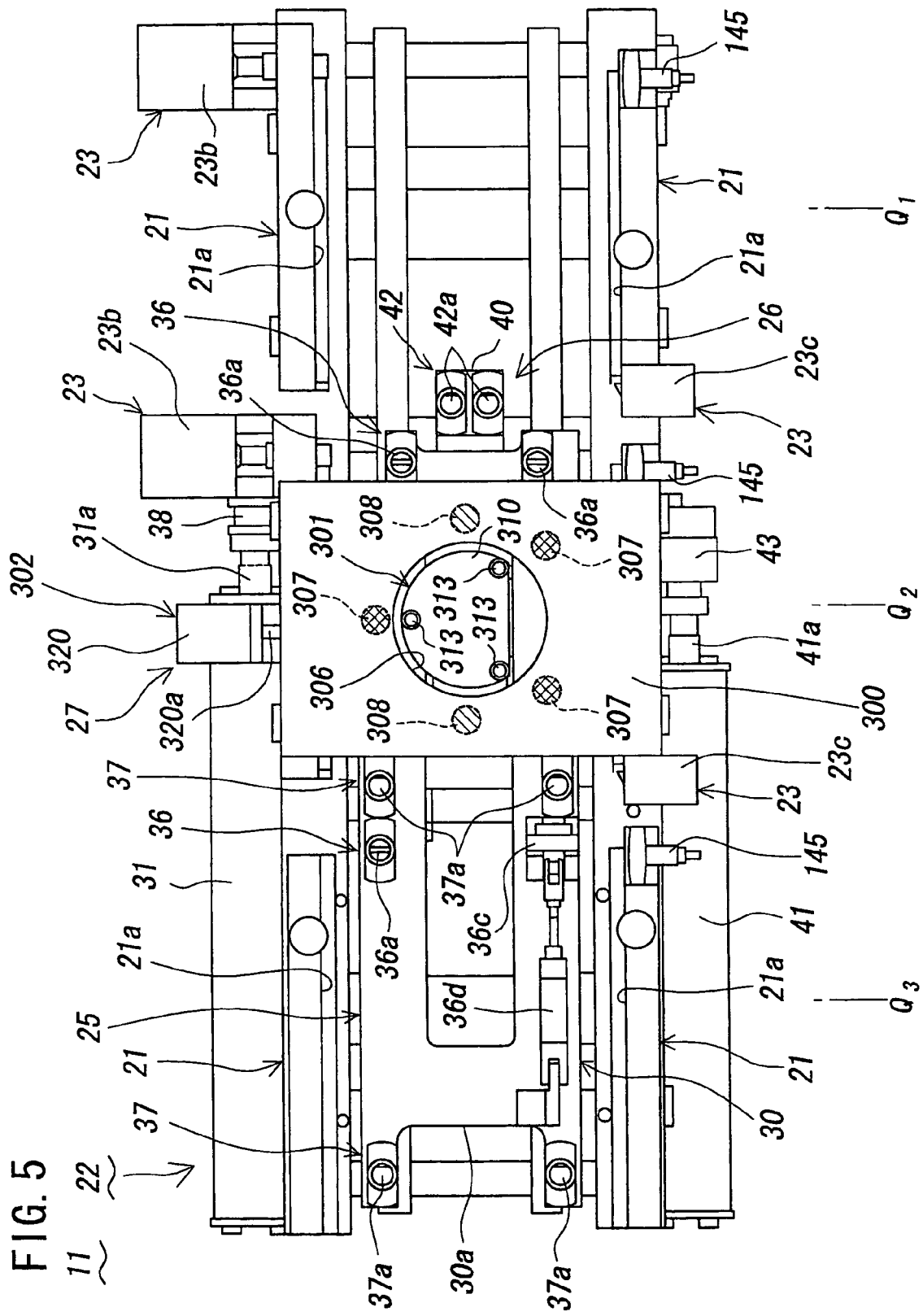
FIG. 5 is a plan view showing a carrying section of a carrying device of the machining cell.

The carrying rail 21 serves to guide the honing jig 20 for retaining the work W, and as shown in FIG. 4 and FIG. 5, it has a shape of linear guide rail provided with guide groove 21a to guide the honing jig 20, and also, at the machining position of precision boring machine 5a and the measuring position of measuring device 6a are respectively disposed the positioning device 23 for positioning the honing jig 20 as described later. Also, at the machining position of precision boring machine 5a is disposed locking device (locking means) 27 for securely holding the movement of the honing jig 20 positioned by the positioning device 23.

The work moving device 22 serves to feed in a tact fashion the honing jig 20 placed on the carrying rail 21 to a predetermined position. Specifically, it includes a cylinder unit for pushing and moving the honing jig 20, and in the preferred embodiment shown, it comprises a pair of air cylinder units 25, 26.

The first air cylinder unit 25 includes a moving base 30 reciprocally movably disposed along the guide groove 21a of the carrying rail 21 and air cylinder 31 for reciprocally moving the moving base 30.

The moving base 30 has two sets of structures (jig base holding structure) for holding the honing jig 20 which are disposed at spaced intervals fore and back, structurally holding the arrangement of two honing jigs 20. The fore and back jig base holding structures are basically almost identical with each other, and specifically, it comprises a pair of fitting claw mechanisms 36, 37 for fitting and holding the pallet of honing jig 20 or the front and back edges of jig base 35 from the front and back thereof.

The front fitting mechanism 36 comprises a pair of right and left fitting claws 36a, 36a having a slant portion at both of the front and back sides, and repulsive springs 36b, 36b which always upwardly energize the fitting claws 36a, 36a. Thus, the pair of right and left fitting claws 36a, 36a are of fitting structure which allows the jig base 35 of the honing jig 20 to move relatively in both forward and backward directions. That is, when the jig base 35 tends to move relatively in both forward and backward directions, the pair of right and left fitting claws 36a, 36a move downward against the repulsion of the repulsive springs 36b, 36b due to the action of the slant portions at both of the front and back sides, thereby allowing the relative movement of the jig base 35.

Also, in the front fitting mechanism 36 in the rear both jig base holding structure, one of the right and left sides comprises the fitting claw 36a and the repulsive spring 36b, and the other comprises the fitting claw 36c which is able to rock vertically and air cylinder 36d which vertically rocks the fitting claw 36c between the fitting position (standing up position shown in FIG. 7) and the fitting release position (lying down position not shown), and the fitting claw 36c cooperates with the fitting mechanism 37 at the back side and serves a function to lock the position of the jig base 35 positioned at the portion.

The back fitting mechanism 37 comprises a pair of right and left fitting claws 37a, 37a having a slant portion only at the back sides, and repulsive springs 37b, 37b which always upwardly energize the fitting claws 37a, 37a. Thus, the pair of right and left fitting claws 37a, 37a are of fitting structure which allows the jig base 35 of the honing jig 20 to move relatively only in forward direction.

That is, when the jig base 35 tends to move relatively in forward direction, the pair of right and left fitting claws 37a, 37a move downward against the repulsion of the repulsive springs 36b, 36b due to the action of the slant portion at the back side, thereby allowing the relative movement of the jig base 35, and on the other hand, even when the jig base 35 tends to move relatively in backward direction, the pair of right and left fitting claws 37a, 37a being vertical at the front side do not move downward due to the repulsion of the repulsive springs 36b, 36b, thereby blocking the relative movement of the jig base 35.

The air cylinder 31 is horizontally disposed on the carrying section base 24 at a position under the carrying rail 21, and its piston rod 31a is connected to the moving base 30 via joint 38.

Also, the second air cylinder unit 26 comprises a moving base 40 reciprocally movably disposed along the guide groove 21a of the carrying rail 21 at a position under the moving base 30 of the first air cylinder unit 25, and an air cylinder 41 which reciprocally moves the moving base 40.

The moving base 40 comprises, at its front end position, a fitting claw mechanism 42 for fitting and holding the rear edge of the jig base 35 of the honing jig 20.

The fitting claw mechanism 42 comprises a pair of right and left fitting claws 42a, 42a having a slant portion only at the back side, and repulsive springs 42b, 42b which always upwardly energize the fitting claws 42a, 42a. Thus, the pair of right and left fitting claws 42a, 42a are of structure which allows the jig base 35 of the honing jig 20 to move relatively only in forward direction.

That is, when the jig base 35 tends to move relatively in forward direction, the pair of right and left fitting claws 42a, 42a move downward against the repulsion of the repulsive springs 42b, 42b due to the action of the slant portion at the back side, thereby allowing the relative movement of the jig base 35, and on the other hand, even when the jig base 35 tends to move relatively in backward direction, the pair of right and left fitting claws 42a, 42a, being vertical at the front side, do not move downward due to the repulsion of the repulsive springs 42b, 42b, thereby blocking the relative movement of the jig base 35.

Also, corresponding to the fitting claw mechanism 42 of the moving base 40, there is provided an approach depression 30a being open backward at the rear end of the moving base 30 of the first air cylinder unit 25.

The air cylinder 41 is disposed sidewise opposite to the air cylinder 31, and specifically, it is horizontally installed on the carrying section base 24 at a position under the carrying rail 21, and its piston rod 41a is connected to the moving base 40 via joint 43.

In this way, the first and second air cylinder units 25, 26 with the air cylinders 31, 41 interlocked with each other serve to feed in tact fashion the honing jig 20 placed on the carrying rail 21 to a predetermined position, that is, to the machining position of honing machine 5 and the measuring position of measuring device 6.

Figure 6:
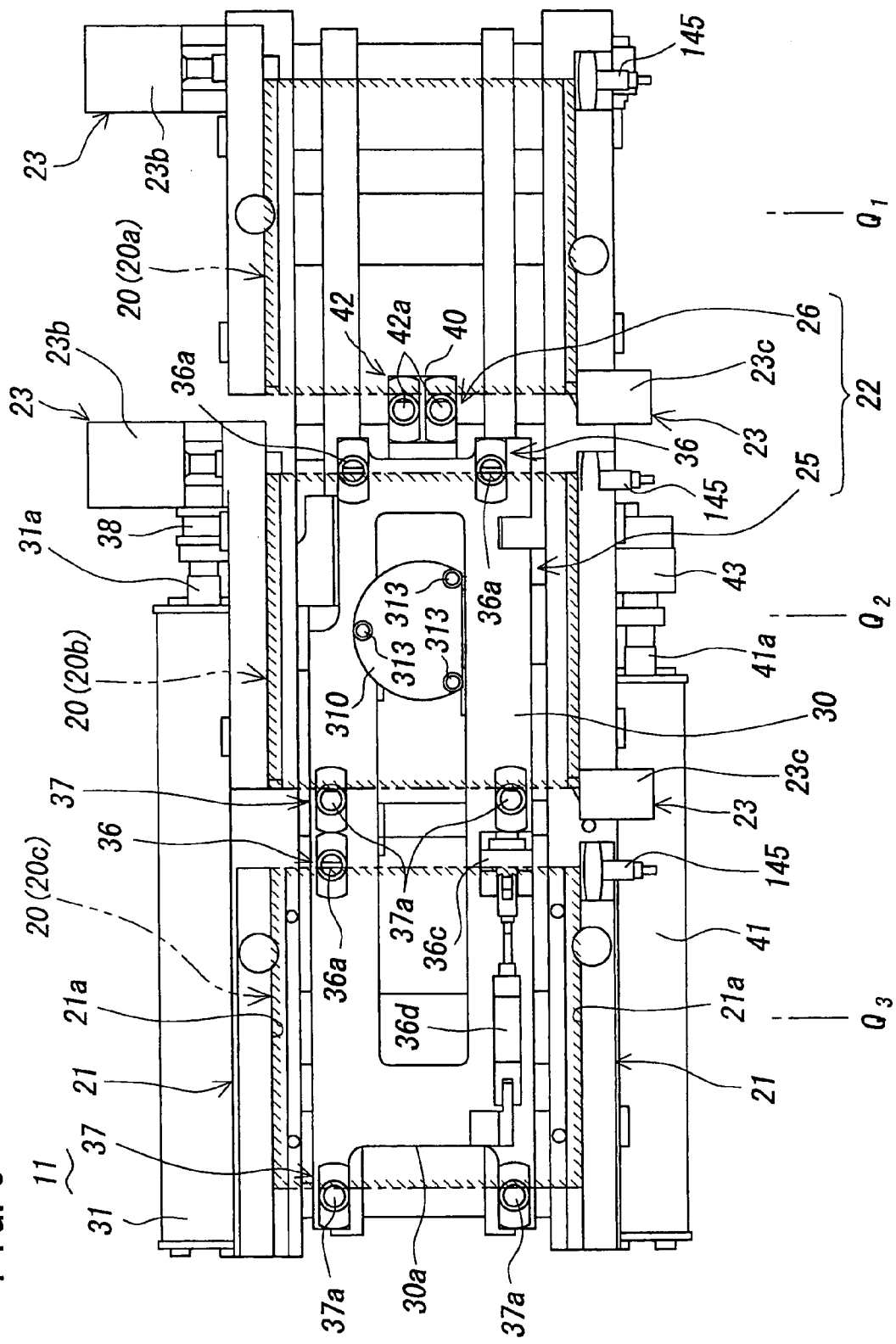
FIG. 6 is a plan view showing the carrying device of the machining cell with the locking device of the carrying section removed.
Figure 7:
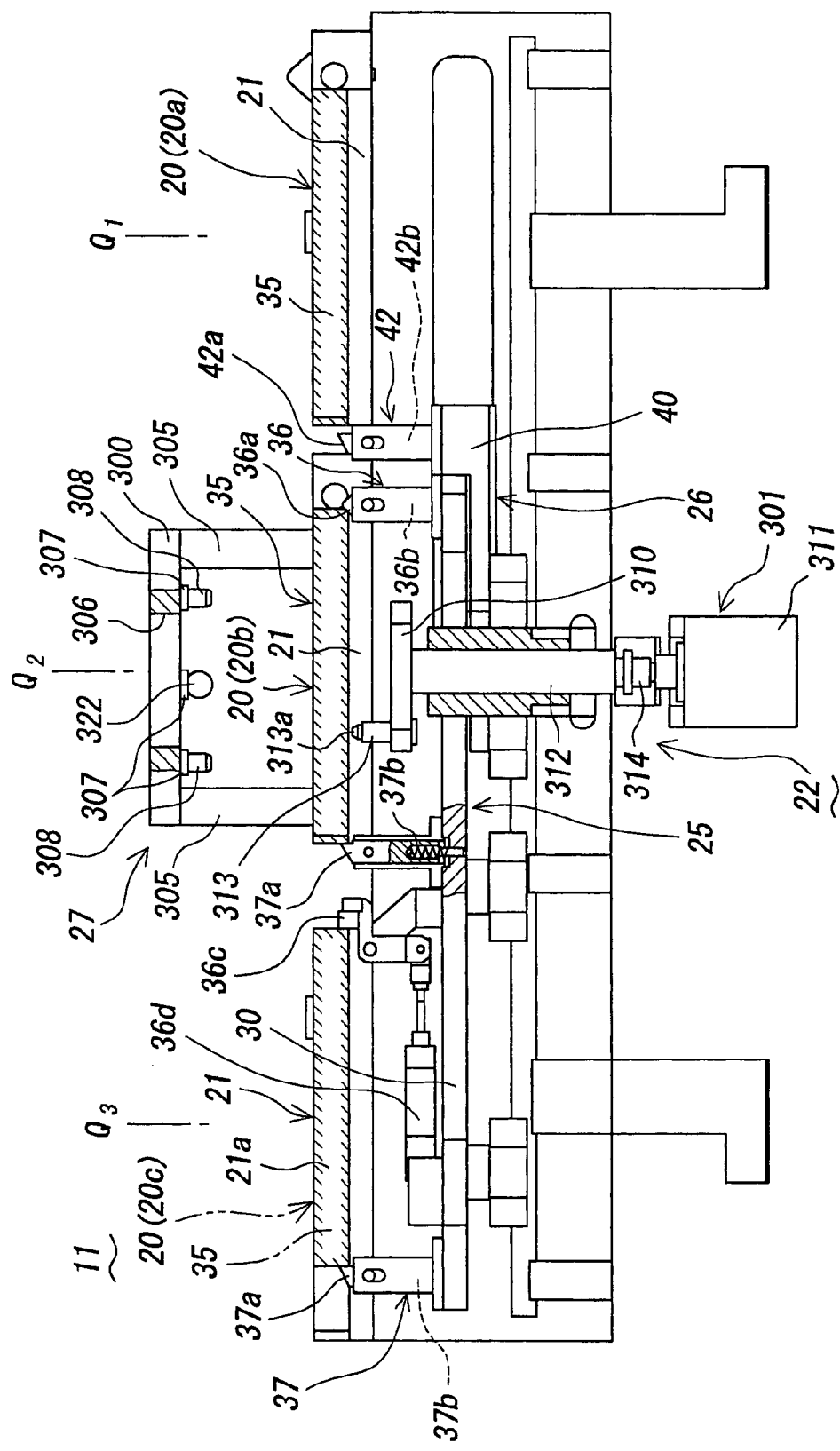
FIG. 7 is a side view partly in section of the carrying section.

Specifically, when the piston rods 31a, 41a of the air cylinders 31, 41 of the first and second air cylinder units 25, 26 are at the retracting position, the front, middle, and rear honing jigs 20a, 20b, 20c are respectively at the measuring position of measuring device 6a (Q1 in FIG. 5 to FIG. 7), the machining position of precision boring machine 5a (Q2 in FIG. 5 to FIG. 7), and the standby position (Q3 in FIG. 5 to FIG. 7). At the time, the front and middle honing jigs 20a, 20b at the measuring position Q1 and machining position Q2 are respectively positioned and held by the positioning devices 23, 23, while the rear honing jig 20c at the standby position Q3 is positioned and held by the rear jig base holding structure of the moving base 30.

In this condition, as the state of being positioned and held by the positioning device 23, 23 is released, the piston rods 31a, 41a of the air cylinders 31, 41 sequentially protrude.

That is, firstly, (1) the piston rod 41a of the air cylinder 41 protrudes, then the front honing jig 20a is fed intact fashion to the standby position (Q3 in FIG. 18 and FIG. 19) of the front machining cell (machining cell A2 in this case) described later.

Subsequently, (2) the piston rod 31a of the air cylinder 31 protrudes, then the middle and rear honing jigs 20b, 20c are respectively sent in tact fashion from the machining position Q2 and standby position Q3 to the measuring position Q1 and machining position Q2. The middle and rear honing jigs 20b, 20c fed to the measuring position Q1 and machining position Q2 are respectively positioned and held by the positioning device 23, while the movement of the rear honing jig 20c at the machining position Q2 is further completely locked by the locking device 27.

Subsequently, the state of being positioned and held by the positioning device 23, 23 is maintained, and the state of being positioned and held by the rear jig base holding structure of the moving base 30 is released. After that, the piston rods 31a, 41a of the air cylinders 31, 41 sequentially retract.

That is, firstly, (3) the air cylinder 31 retracts to the retracting position, and while the middle and rear honing jigs 20a, 20b are positioned and held at the position by the positioning device 23, only the moving base 30 returns to the position shown in FIG. 6 and FIG. 7, then the rear jig base holding structures 36, 37 at the first air cylinder unit 25 engage and hold the jig base 35 of the next honing jig 20 at the standby position Q3, and also, the front jig base holding structures 36, 37 engage and hold the jig base 35 of the rear honing jig 20c at the machining position Q2.

Subsequently, (4) as the air cylinder 41 retracts to the retracting position, the fitting claw mechanism 42 at the second air cylinder unit 26 engages the rear edge of the jig base 35 of the middle honing jig 20b at the measuring position Q1 of the measuring device 6a.

Also, in this connection, at a proper portion of the carrying rail 21, there is provided a proximity switch 145 which detects that the honing jig 20 is at the measuring position Q1, machining position Q2, and standby position Q3.

Figure 8:
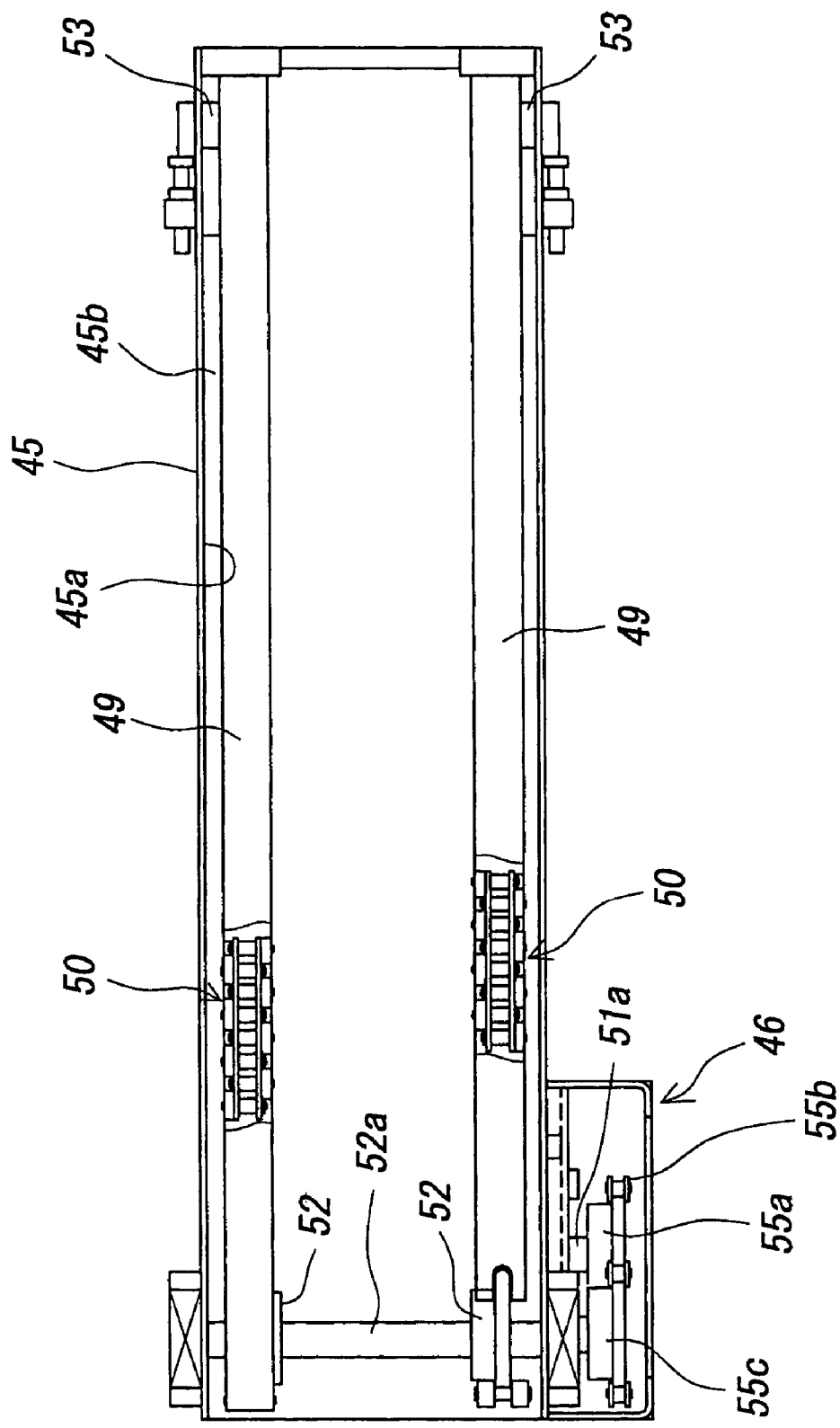
FIG. 8 is a plan view showing the feedback section of the carrying device of the machining cell.
Figure 9:
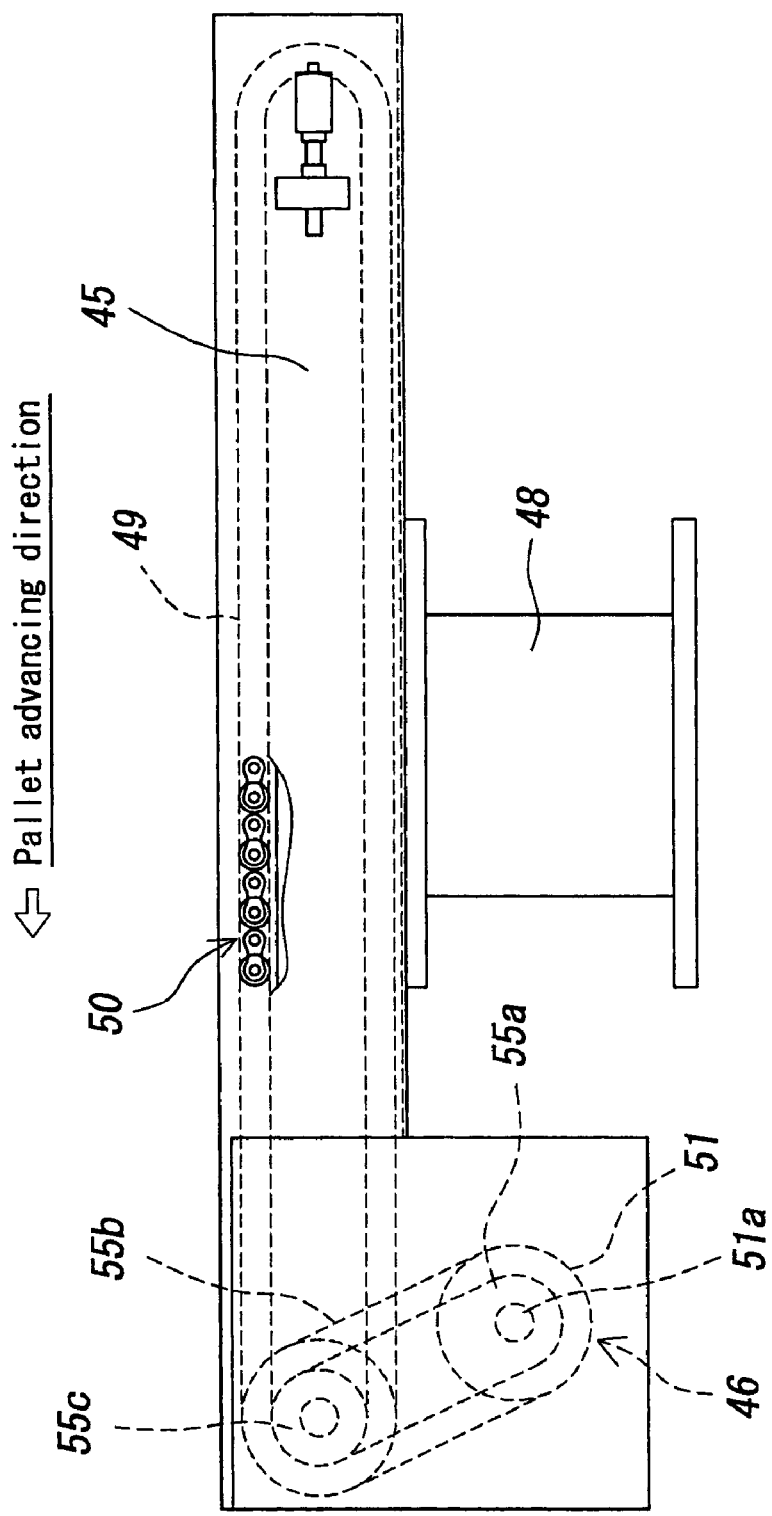
FIG. 9 is a side view partially broken away of the feedback section.
Figure 10:
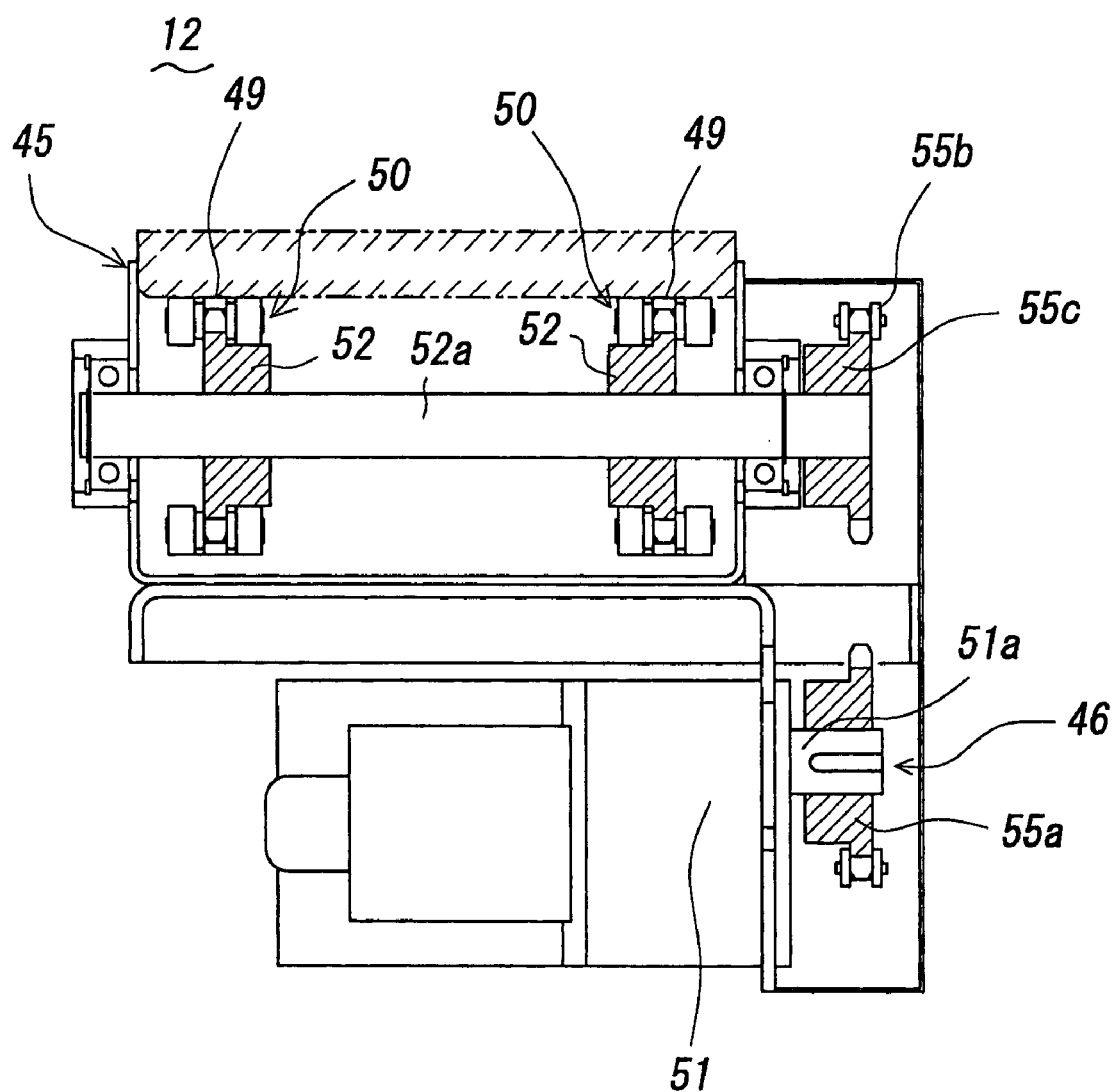
FIG. 10 is a front view showing the feedback section.

The feedback section 12, as shown in FIG. 8 to FIG. 10, comprises feedback rail 45, work feedback device (work returning means) 46 which are disposed on feedback section base 48. The feedback rail 45 of the feedback section 12, as described later, functions as a reference position of the machining cell A1 together with the carrying rail 21 of the carrying section 11, and is also structurally able to change the normal and reverse directions of flow of the work W.

The feedback rail 45 serves to guide the honing jig 20 for holding the work W with machining completed, and as shown in FIG. 8 and FIG. 9, it is shaped as a linear guide rail provided with guide groove 45a which guides the honing jig 20, and in the preferred embodiment shown, it also includes a traveling surface for guiding the work feedback device 46.

The work feedback device 46 serves to return the honing jig 20 placed on the feedback rail 45, and specifically, it comprises an endless carrying device for endlessly carrying the honing jig 20. In the preferred embodiment shown, it comprises a roller chain type carrying device 46.

The carrying device 46 comprises a pair of roller chains 50, 50 for placing and carrying the jig base 35 of the honing jig 20, traveling on a pair of roller chain supports 49, 49, and a drive motor 51 for driving the roller chains 50, 50.

The roller chain 50 is set over sprocket wheel 52 and tension guide 53, and is disposed so as to be able to travel on the roller chain support 49 laid on the feedback rail 45.

And, as the drive motor 51 is operated, the roller chain 50 travels supporting the bottom of the jig base 35 of the honing jig 20.

The drive motor 51 is fixed on the feedback section base 48, while drive shaft 51a is connected to the support shaft 52a of the sprocket wheels 52, 52 via sprocket wheel 55a, transmission roller chain 55b, and sprocket wheel 55c.

It is also preferable to use a belt type carrying device instead of the roller chain type carrying device 46.

Figure 11:
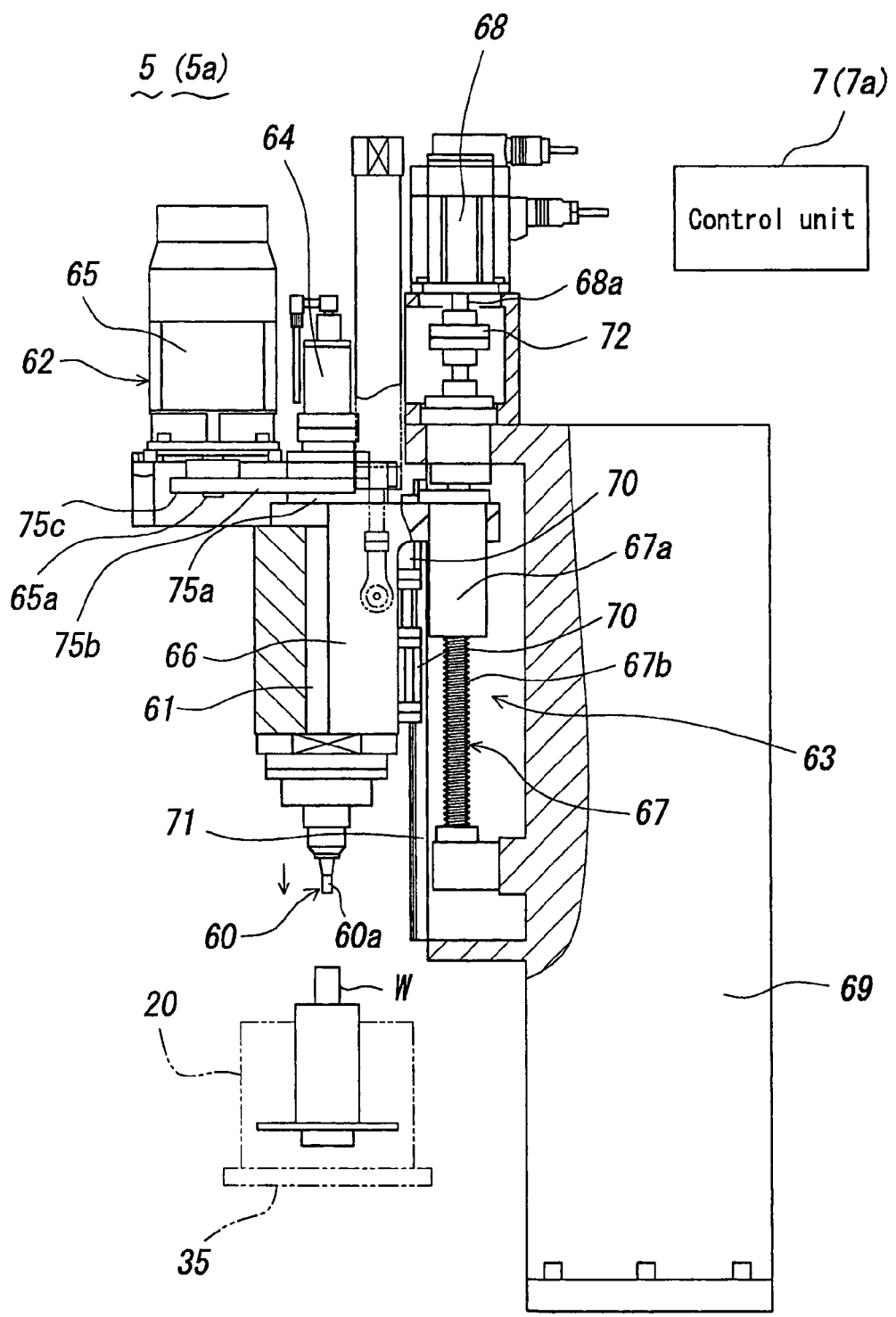
FIG. 11 shows a general configuration partly in section of a precision boring machine of the automatic honing system.

The precision boring machine 5a is, specifically, upright as shown in FIG. 11, and comprises main components such as rotary spindle 61 provided with boring bar 60 at its end, spindle drive unit (spindle rotating means) 62, spindle feed drive unit (spindle feeding means) 63, grindstone drive unit (grindstone driving means) 64, and control unit (controlling means) 7a.

The boring bar 60 serves to cut the machining bore diameter surfaces of work W and is replaceably attached to the end or bottom of the rotary spindle 61, and boring tool 60a is removably attached to the end portion thereof. As the boring tool 60a, a hard metal tool, diamond tool or the like is used, which is properly selected in accordance with the conditions for machining bore surfaces of work W.

Also, the rotary spindle 61 comprises boring bar 60 at its lower end and is connected to the spindle drive unit 62 including the drive motor 65, and the spindle feed drive unit 63 including slide body 66, feed screw mechanism 67, and drive motor 68.

That is, the rotary spindle 61 is rotatably supported on the slide body 66, and the slide body 66 is vertically movably disposed on linear rail 71 extending vertically of unit body 69 via linear guides 70, 70. Also, the slide body 66 is connected to the nut portion 67a of the feed screw mechanism 67 disposed on the unit body 69. The feed screw mechanism 67, specifically, comprises a ball screw, and the screw portion 67b is connected to the motor shaft 68a of the drive motor 68 via coupling 72.

And, as the drive motor 68 is operated, the feed screw mechanism 67 operates, then the rotary spindle 61 or the boring bar 60 is moved (fed) together with the slide body 66 in the axial direction of the machining bore surface of work W.

Also, transmission pulley 75a is fitted to the upper end of the rotary spindle 61, and the transmission pulley 75a is connected to transmission pulley 75c fitted to the motor shaft 65a of the drive motor 65 via transmission belt 75b.

And, as the drive motor 65 is operated, the rotary shaft 61 or the boring bar 60 is rotated about the axis via transmission mechanisms 75a to 75c.

Figure 12:
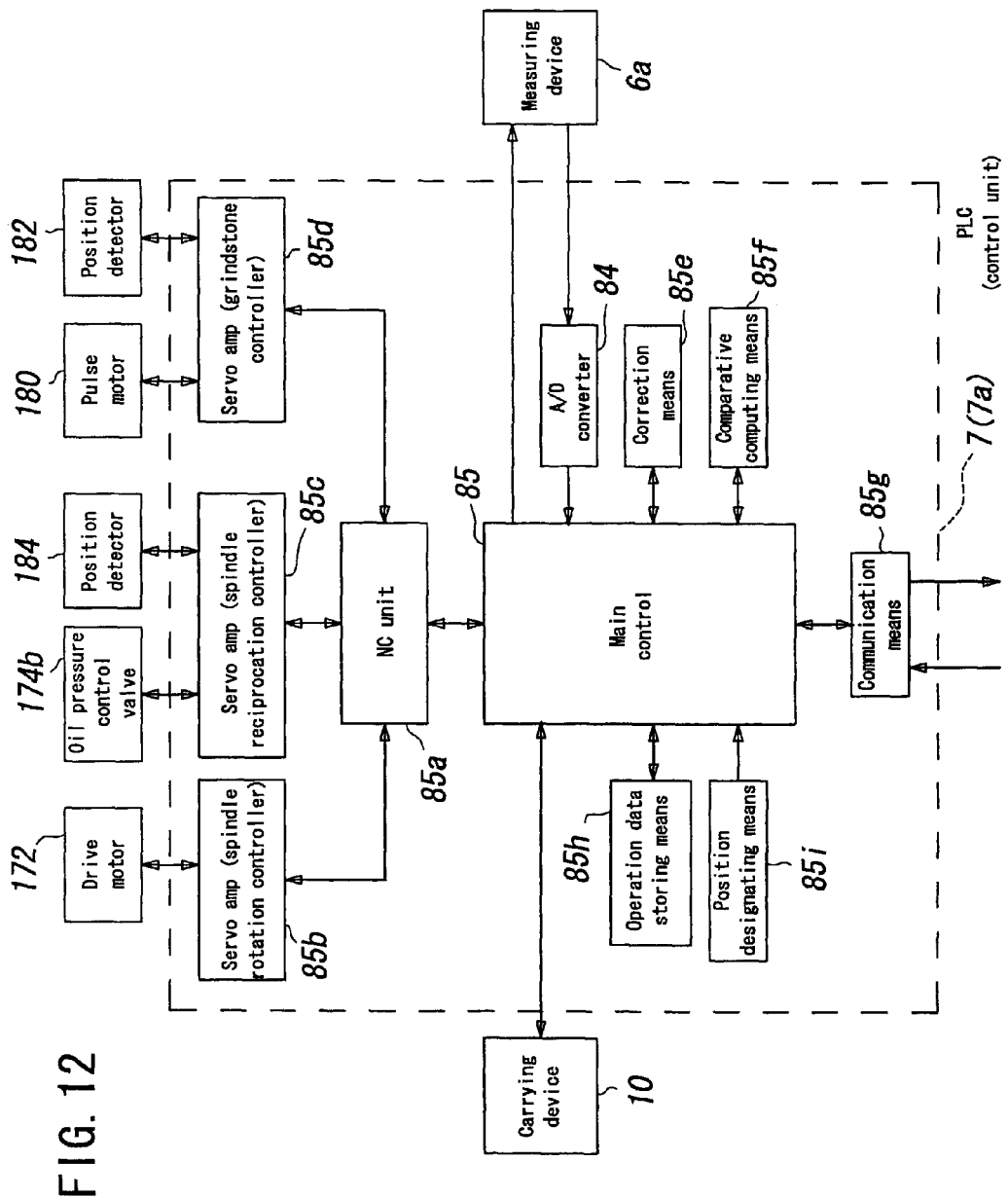
FIG. 12 is a block diagram showing an example of a control unit of the machining cell.

In the boring machine 5a, the boring tool 60a is securely fitted to the end of the boring bar 60, but it is also preferable to attach boring tool 60a protrudably and retractably to the boring bar 60 and to comprise a tool cutting means which gives a predetermined cutting operation to the boring tool 60a The control unit 7a serves to automatically control the operation of each drive unit of the precision boring machine 5a in mutually interlocked fashion, and specifically, as shown in FIG. 12, it comprises PLC (Programmable Logic Controller) including NC unit 85a, servo amplifiers 85b, 85c, 85d, main controller 85 and I/O port.

The NC unit 85a with a predetermined machining program or the like built therein for the execution of boring serves to operate each drive unit of the precision boring machine 5a via the servo amplifiers 85b, 85c, 85d.

PLC, control unit 7a, sends and receives signals through I/O port according to the predetermined execution procedure in order to operate the carrying device 10, NC unit 85a, and measuring device 6a. PLC comprises A/D converter 84, correcting means 85e, and comparative computing means 85f. The A/D converter 84 digitizes the analog signal output from the measuring device 6a. The correcting means 85e serves to correct the measured values digitized by the A/D converter 84. The comparative computing means 85f serves to judge the machined state of work by the measured values corrected.

The result of judgment made by the comparative computing means 85f is used for feedback control of NC unit 85a of the relevant cell and is also sent to a cell for the next process as feed forward control data. Accordingly, there is provided communication means 85g for establishing communication with other cells.

Further, operation data storing means 85h and position designating means 85i are disposed in order to regulate the communicating operation executed via the communication means 85g according to the position in the machining section.

Thus, in the precision boring machine 5a having the configuration as described above, the drive motors 65, 68 are automatically controlled by the control unit 7a in mutually interlocked fashion, and under-bore boring is executed on work W carried by the work carrying section 11.

Although it is not specifically shown, it is also preferable to configure such that the precision boring machine 5a, as conventionally well-known, comprises a tool cutting mechanism (tool cutting means) which gives a predetermined cutting operation to the boring tool 60a and is able to cope with the change in under-bore diameter of work W.

Figure 13:
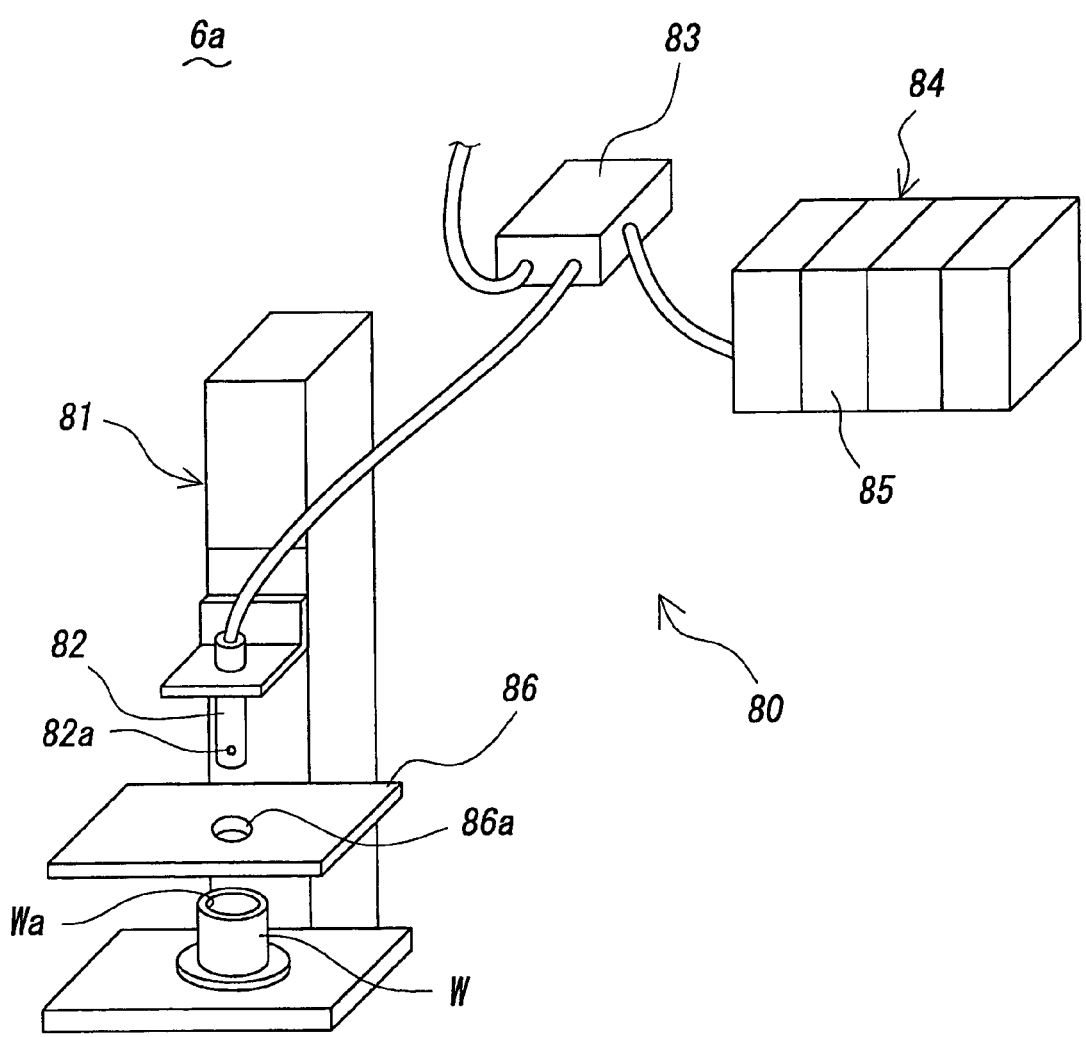
FIG. 13 is a perspective view showing a specific example of a measuring device of the machining cell.

The measuring device 6a serves to measure the machining diameter of work W, and specifically, comprises air micrometer 80 as its main component as shown in FIG. 13.

The air micrometer 80 comprises measuring head 82 vertically slidably fitted on measuring shaft unit 81, and A/E converter 83 which converts the discharge pressure of measuring air supplied from an air source (not shown) to air nozzle 82a of the measuring head 82 into a voltage signal. The voltage signal converted by the A/E converter 83 is output to the A/D converter 84 of PLC that is the control unit 7a.

Figure 14:
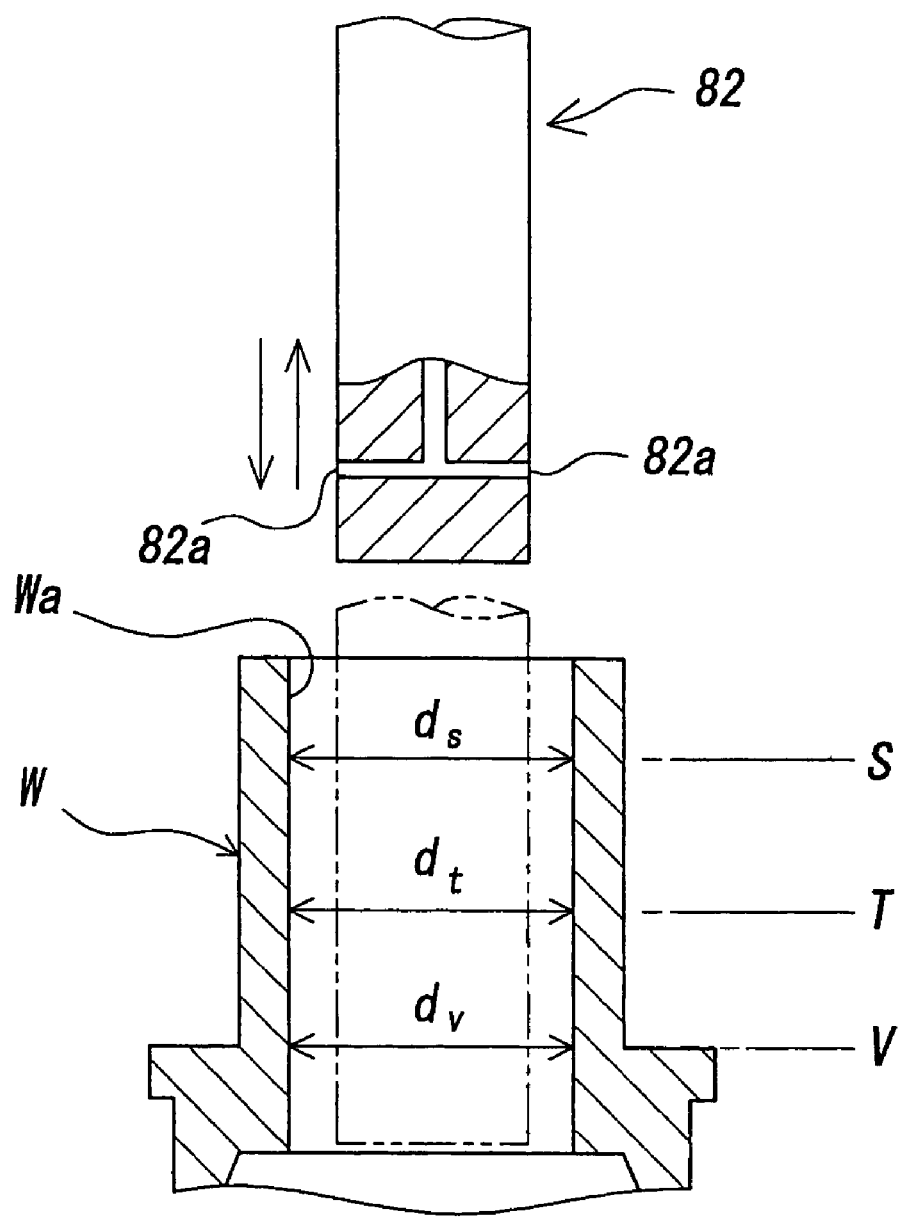
FIG. 14 is a longitudinal sectional view showing an essential portion of the measuring device.

The measuring head 82 of the air micrometer 80 is reciprocally movable in the axial direction or the vertical direction of the machining hole Wa of work W as shown in FIG. 14 due to a driving mechanism (not shown) of the measuring shaft unit 81.

The measuring head 82 is cylindrical in shape having outer diameter smaller than the inner diameter of the machining hole Wa of work W, and at its outer periphery are radially outwardly disposed air nozzles 82a, 82a from which the measuring air is jetted.

And, with the measuring head 82 inserted into the machining hole Wa of work W, the measuring air is jetted out of the air nozzles 82a, 82a, then the inner diameter of the machining hole Wa is measured from the alteration of the measuring air pressure due to gaps between the inner diameter surface of machining hole Wa and the outer periphery surface of measuring head 82.

This measurement is executed via master gauge 86 arranged just above the work W being the measuring position as shown in FIG. 13. That is, while the measuring air is jetted out of the air nozzles 82a, 82a of the measuring head 82, the measuring head 82 moves down to the position of gauge hole 86a of the master gauge 86, then measured value being 0 (reference), the machining hole Wa of work W is measured. The number of inner diameters of the machining hole Wa to be measured are set in accordance with the axial length of the machining hole Wa, as shown in FIG. 14. In the preferred embodiment shown, the inner diameters (ds, dt, dv) at three portions S, T, V in the axial direction of the machining hole Wa are measured. The measured values are outputted from the A/E converter 83 as analog voltage signals (±2.5V for example) and converted into digital values by the A/D converter 84 of PLC that is the control unit 7a and also displayed by a display unit (not shown) as measured values.

This measurement is executed a plurality of times, 10 times for example, with respect to each point (S, T, V), and the average value is used as the measured value. The PLC, control unit 7a, has correcting means 85e for correcting the measured value. The correction includes a partial correction for individually correcting the inner diameters ds, dt or dv and an overall correction for correcting the inner diameters ds, dt and dv all together. The correction value is, for example, determined so that the measured value of a master piece of work W, corrected by the correction value, corresponds to the standard value of the master piece, and it is used for the correction of measured values to be made thereafter.

The lowering operation of the measuring head 82 by means of the driving mechanism of the measuring shaft unit 81 is controlled so that the measuring head 82 is not damaged. In the present preferred embodiment, a drive motor is used as a drive source for the driving mechanism of the measuring shaft unit 81, and the torque of the drive motor is controlled to prevent the measuring head 82 being small in diameter from being damaged. As an example, in the case of measuring head 82 whose outer diameter is 4 mm or less, the torque of the driving mechanism is limited when the head moves down, and the torque is 100% when the head moves up.

The three measured values ds, dt and dv corrected by the correcting means 85e, measured by the measuring head 82, are delivered to the comparative computing means 85f of PLC, where the bore shape modes of the machining hole Wa of work W are comparatively computed.

In the comparative computation, three measured values ds, dt and dv are compared with the predetermined standard value in order to make the judgment whether the measured values ds, dt and dv are defective or not in accordance with the tolerances such as +NG, ++OK, +OK, OK, −OK, −−OK, −NG. The results of judgment on non-defectives and defectives are used for feedback control of the NC unit 85a of the cell in service and are also sent to the control unit of a cell for the next process as feed forward control data via the communication means 85g of PLC.

The results of judgment on non-defectives and defectives represent whether or not the under-bore diameter of machining hole Wa of work W is within the able range of honing.

That is, if within the able range of machining of ++OK to −−OK, an instruction will be given to the honing machine 5b, at the control unit 7b of the next machining cell A2, so that honing is executed according to the range of the tolerance.

On the other hand, if outside the range of +NG or −NG, it will be judged that honing is not needed, at the control unit 7b of the next machining cell A2, so that the honing machine 5b is suspended.

It is also preferable to use an electric micrometer instead of the air micrometer.

Also, although it is not specifically shown, the configuration and action of the under-bore detector 4 are same as those of the measuring device 6a, and it is judged whether or not the under-bore diameter of machining hole Wa of work W before honing by the precision boring machine 5a is within the able range of honing.

Figure 2:
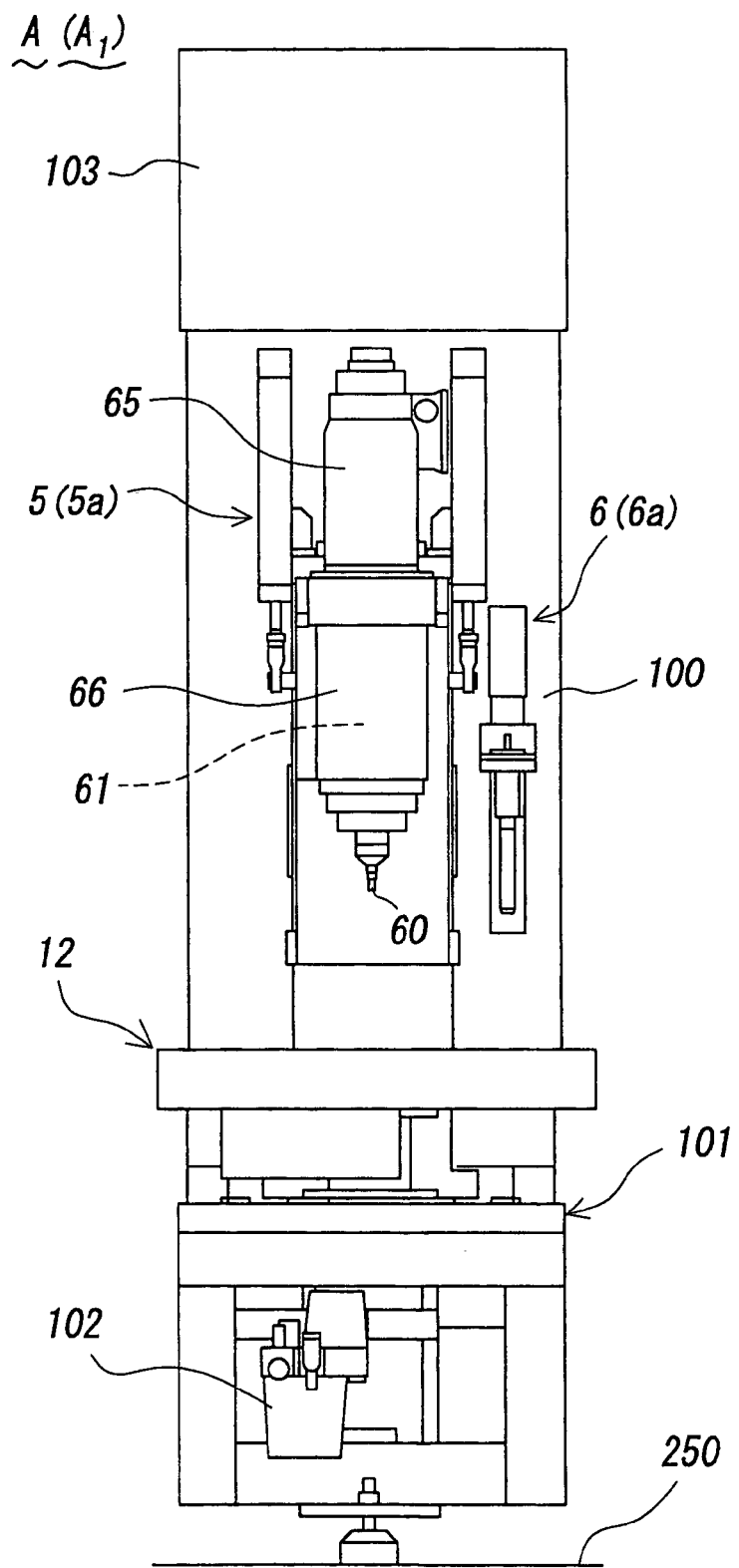
FIG. 2 is a front view showing a processing or machining cell provided with a precision boring machine making up the honing section of the honing system.

As shown in FIG. 2 and FIG. 3, control box 100 with the control unit 7a housed therein is fitted to the rear top of the frame 101. Also, oil feeder 102 as the drive source of machining cell A1 is installed inside the bottom of the frame 101, and spindle cooler 103 for cooling rotary spindle 61 and other parts necessary for machining is disposed on the control box 100, and chip receiver 104 for collecting chips produced during machining is disposed at the rear bottom of the frame 101.

Machining cells A2, A3 equipped with honing machine 5b or 5c are identical in configuration with each other, and their main components are in common with the machining cell A1 equipped with precision boring machine 5a mentioned above.

That is, the machining cells A2, A3, as shown in FIG. 15 to FIG. 22, are of unit structure including carrying device 10 forming a part of work carrying device 1, single honing machine (machine tool) 5 (5b, 5c), measuring device 6 (6b, 6c), and control unit 7 (7b, 7c) for controlling these in mutually interlocked fashion. Also, as described later, the program configuration of control unit 7 (7b, 7c) is properly set, and thereby, the machining cell A2 is used for middle machining, and the machining cell A3 is used for finish machining.

The specific configurations of carrying device 10, measuring device 6 (6b, 6c) and control unit 7 (7b, 7c) are substantially same as that of the machining cell A1, and therefore, same component parts or elements are given same reference numerals and the detailed description is omitted, and only different main components will be described as needed.

Figure 22:
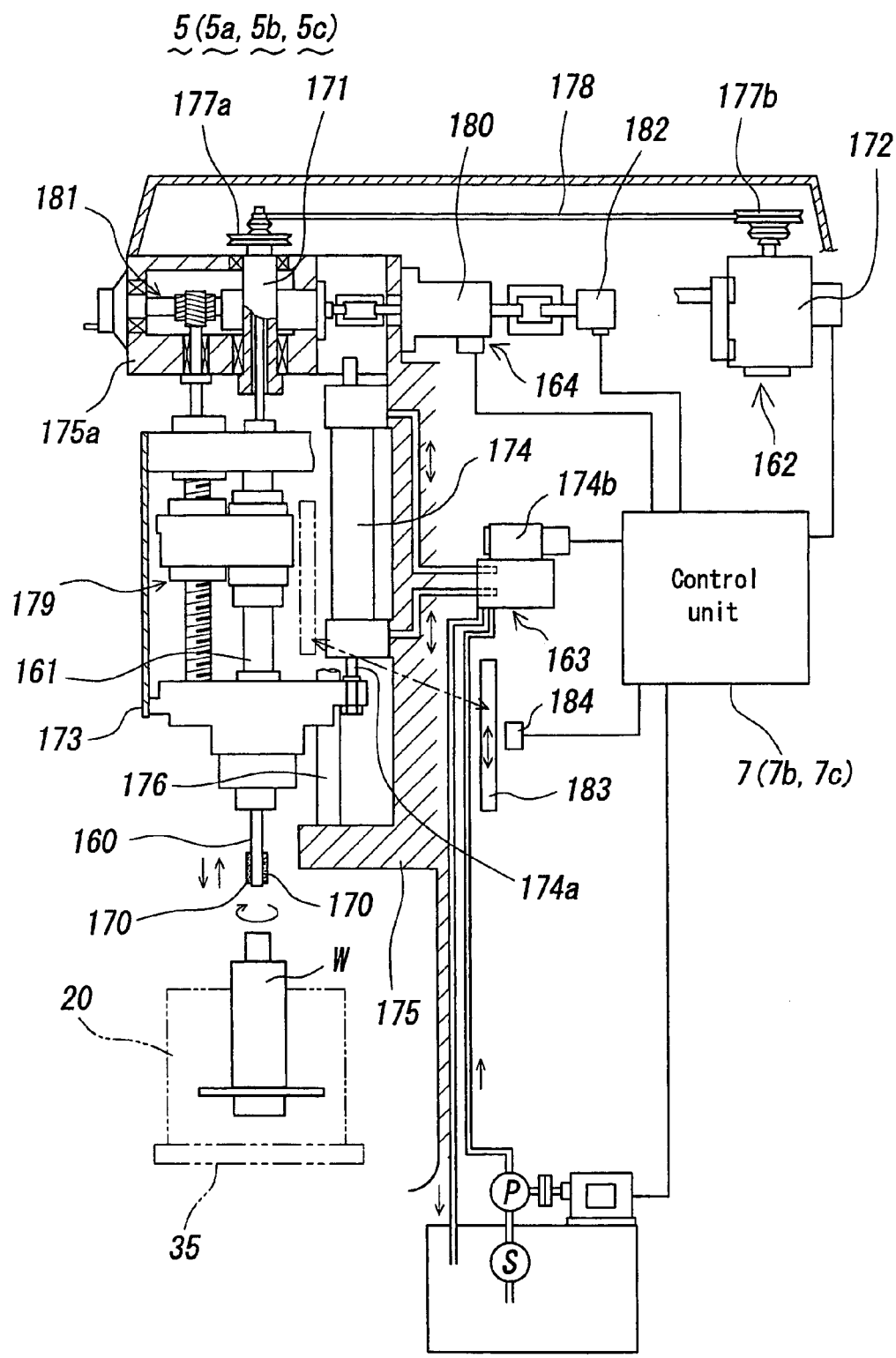
FIG. 22 shows a general configuration partly in section of a honing machine of the automatic honing system.

The honing machine 5 (5b, 5c) is, specifically, upright as shown in FIG. 22, and comprises main components such as rotary spindle 161 provided with honing tool 160 at its end, spindle rotation drive unit (spindle rotating means) 162, spindle reciprocation drive unit (spindle reciprocating means) 163, grindstone drive unit (grindstone driving means) 164, and control unit (controlling means) 7 (7b, 7c).

The honing tool (so-called honing mandrel or honing head) 160 is removably installed at the end or lower end of the rotary spindle 161, in which there are provided a plurality of grindstones 170, 170, . . . arranged in radially expandable fashion, a cone rod (not shown) for their expansion, and a feedback spring (not shown) for returning the honing grindstones 170, 170, . . . And, the honing grindstones 170, 170, . . . are expanded along the down movement of the cone rod, and are contracted by the return spring along the up movement of the cone rod.

The rotary spindle 161 is equipped with honing tool 160 at its lower end, which is connected to the spindle rotation drive unit 162 including drive shaft 171, drive motor 172, etc., and to the spindle reciprocation drive unit 163 including slide body 173, oil hydraulic cylinder 174, etc.

That is, the rotary spindle 161 is rotatably supported by slide body 173, and the slide body 173 is upwardly movably disposed on guide rod 176 vertically extending above the unit body 175 and is connected to the piston rod 174b of oil hydraulic cylinder 174 attached to the unit body 175.

And, as the piston rod 174b of the oil hydraulic cylinder 174 moves up and down, the rotary spindle 161 or honing tool 160 are moved up and down via the slide body 173.

Also, the top end of the rotary spindle 161 is in keyed or splined engagement with the drive shaft 171 rotatably disposed at the head 175a of the unit body 175, and is connected relatively movably in vertical direction (axial direction) and integrally rotatably to the drive shaft 171.

Transmission pulley 177a is fitted to the top end of the drive shaft 171, and the transmission pulley 177a is connected to the transmission pulley 177b fitted to the motor shaft of drive motor 172 via the transmission belt 178.

And, the rotary shaft 161 or honing tool 160 is rotationally driven by the rotational drive of the drive motor 172 via the drive shaft 171.

The grindstone drive shaft 164 serves to give cutting operation to the honing grindstones 170, 170, . . . and comprises the cone rod (not shown) of the honing tool 160, cutting drive mechanism 179 for vertically moving the cone rod, and pulse motor 180 as a drive source.

The cutting drive mechanism 179 is of conventionally well-known structure, which is connected to the motor shaft of the pulse motor 180 via rotation transmitting mechanism 181 disposed at the head 175a of the unit body 175.

And, as the pulse motor 180 is operated in normal direction, the cutting drive mechanism 179 is driven, then the cone rod in the honing tool 160 moves downward and the honing grindstones 170, 170, . . . are expanded. On the other hand, as the pulse motor 180 is operated in reverse direction, the cone rod moves upward and the honing grindstones 170, 170, . . . are contracted (returned) by the return spring in the honing tool 160.

The amount of rotation of the pulse motor 180 for controlling the amount of expansion and contraction of the honing grindstones 170, 170, . . . is detected by position detector 182 such as a rotary encoder.

The control unit 7 (7b, 7c) serves to automatically control each drive unit of the honing machine 5 (5b, 5c) in mutually interlocked fashion. Specifically, as shown in FIG. 12, it comprises PLC (Programmable Logic Controller) including NC unit 85a, servo amplifiers 85b, 85c, 85d, main control unit 85, and I/O port, which incorporates a predetermined machining program or the like for the execution of honing.

Also, to the control unit 7 (7b, 7c) are electrically connected the drive motor 172, oil pressure control valve 174b of oil hydraulic cylinder 174, pulse motor 180 and position detector 182, and also, position detector 184 for detecting the position of the slide body 173 from scale 183 disposed in the slide body 173, and other drive units. The real value information obtained from these is computed and compared with the previously set value, and the operation of each drive unit 162 to 164 is controlled according to the result of comparative computation.

Thus, in the honing machine 5 (5b, 5c) having such configuration, the drive units 162, 163, 164 are automatically controlled by the control unit 7 (7b, 7c) in mutually interlocked fashion, thereby executing honing on work W carried by the work carrying section 11. In this case, at each honing machine 5b, 5c is executed fixed size machining, that is, uniform honing in which the amount of cutting is predetermined over the entire region of honing.

Figure 15:
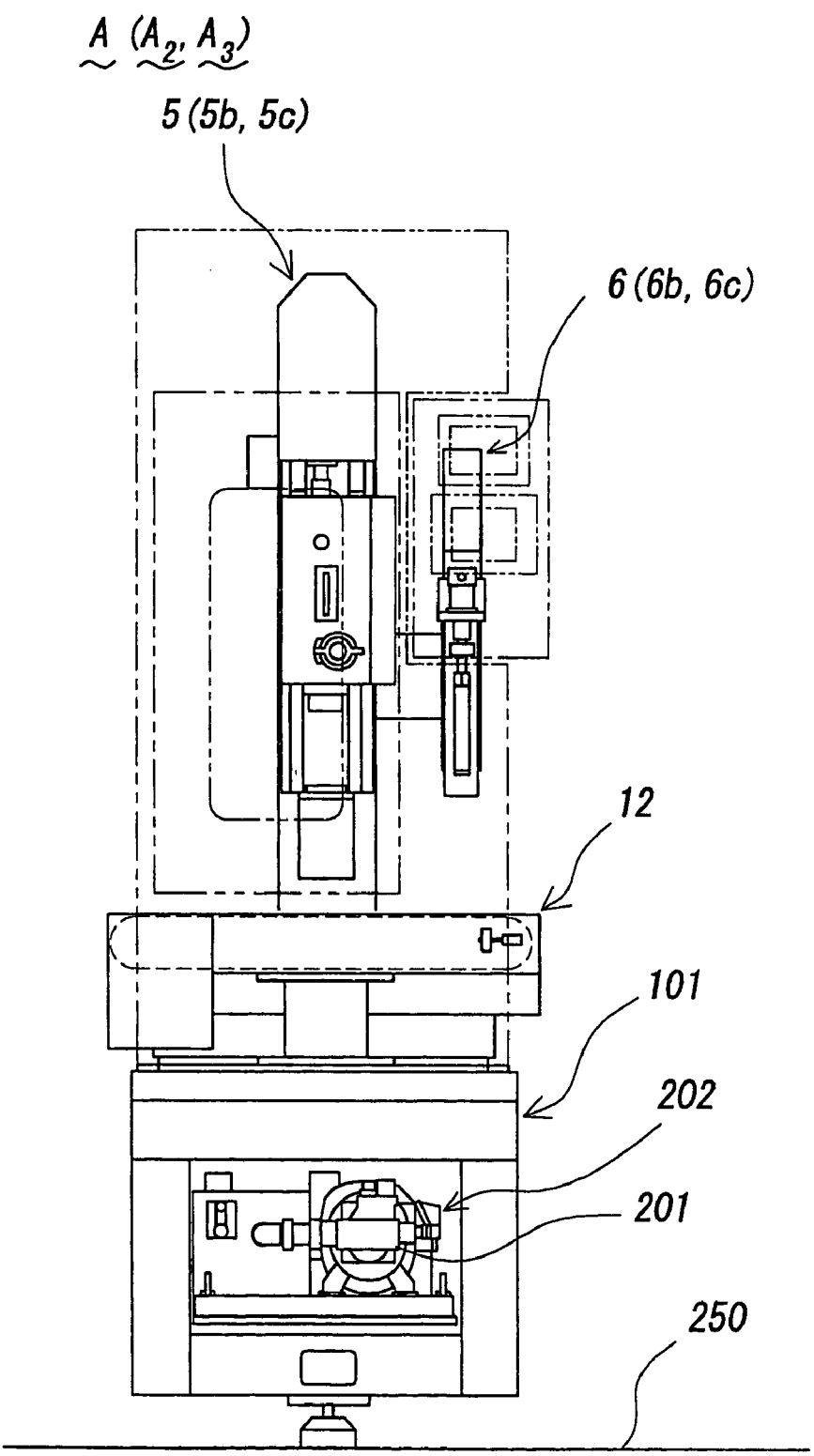
FIG. 15 is a front view showing by partially virtual lines a machining cell provided with a honing machine making up a honing section of the honing system.
Figure 16:
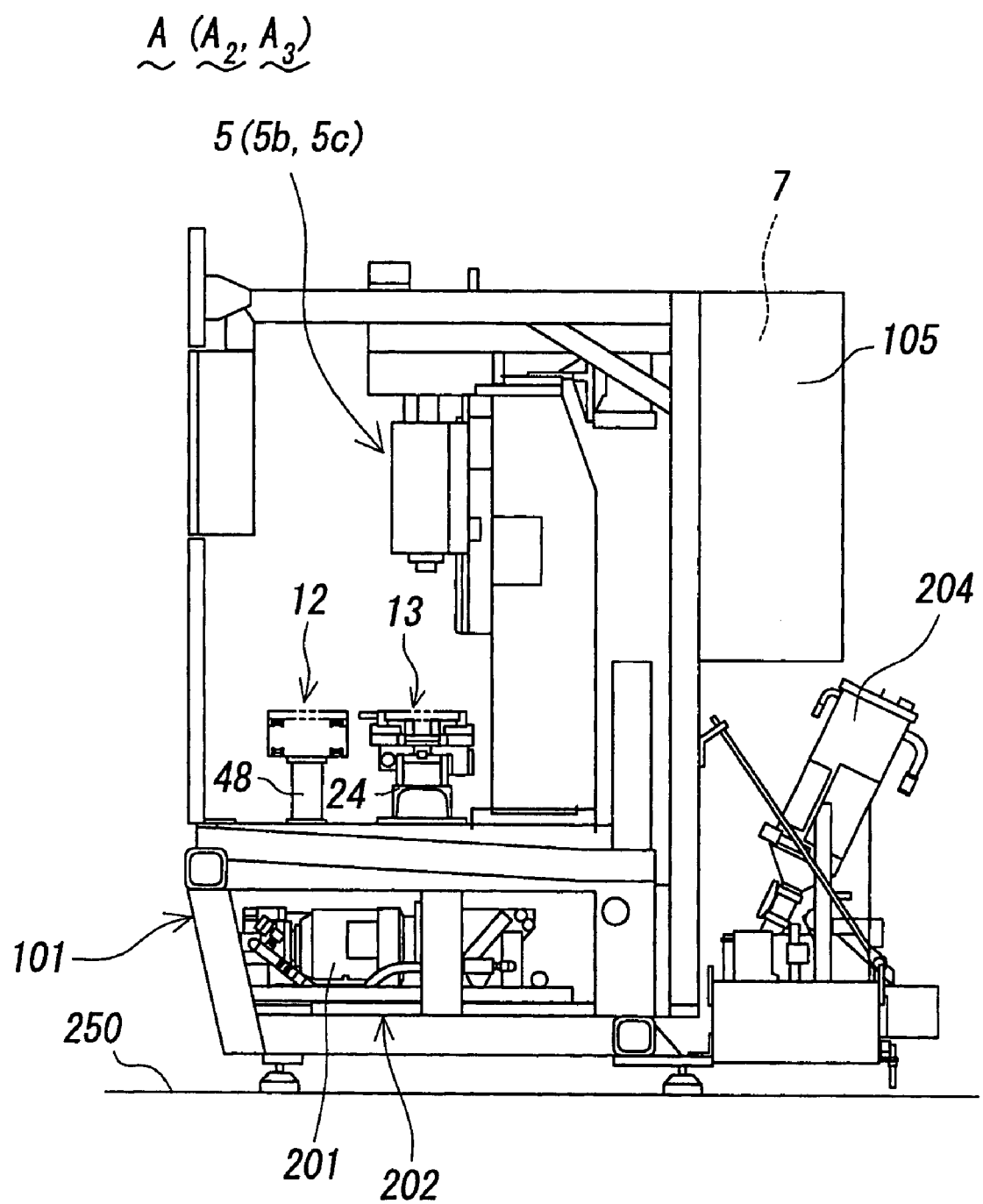
FIG. 16 is a side view showing the machining cell.
Figure 17:
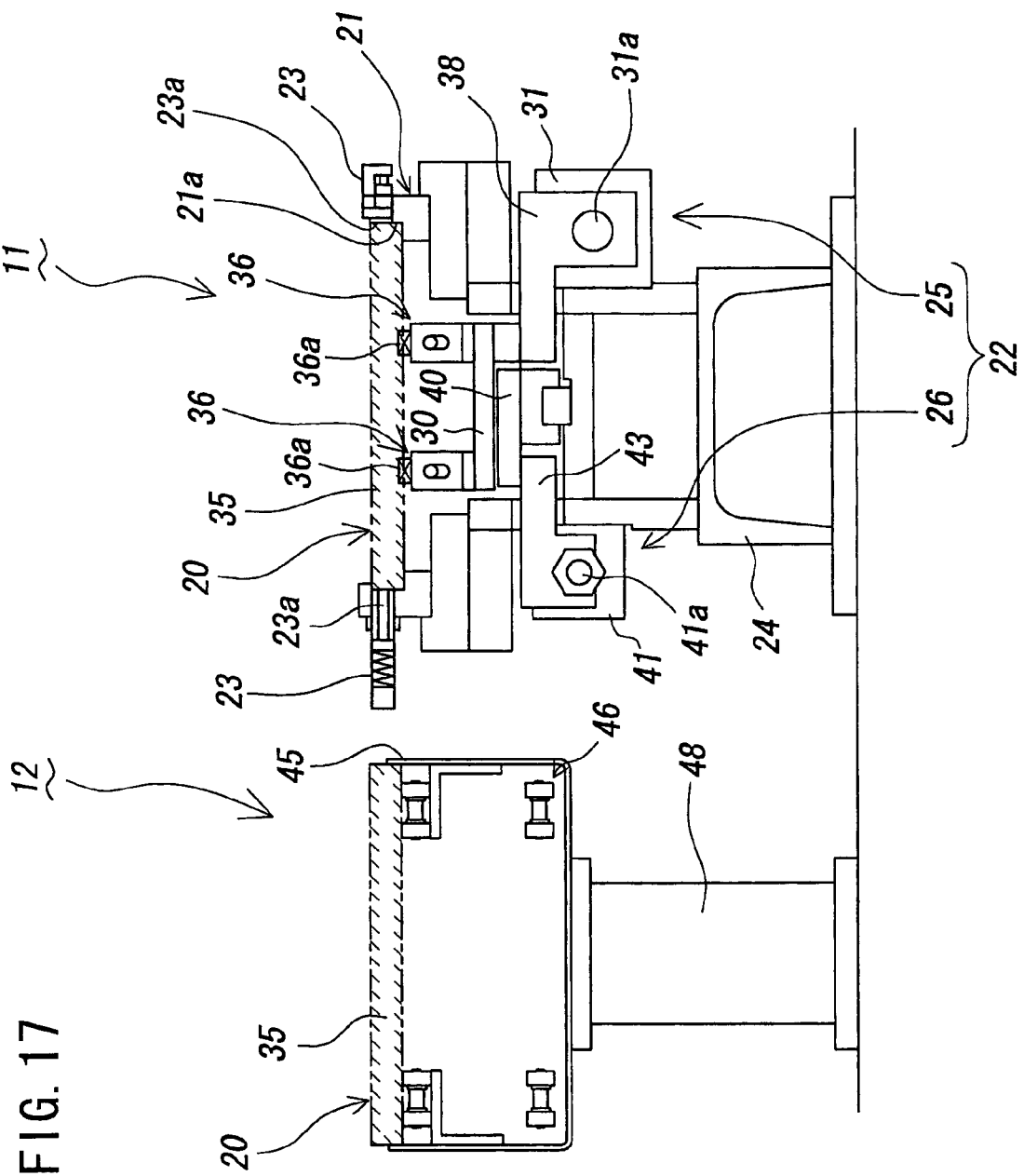
FIG. 17 is a side view showing the enlarged lower part of the machining cell.
Figure 18:
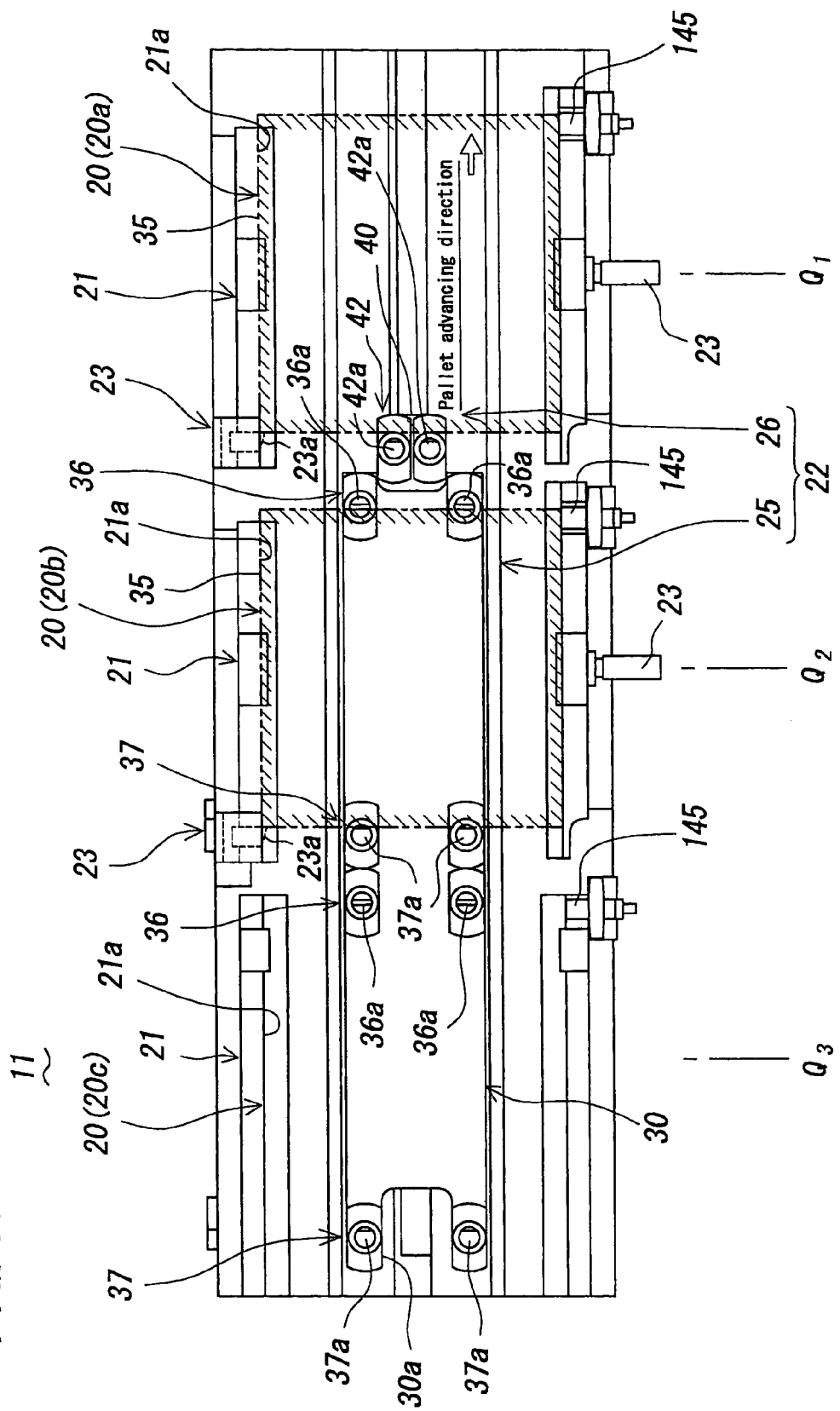
FIG. 18 is a plan view showing a carrying section of the carrying device of the machining cell.
Figure 19:
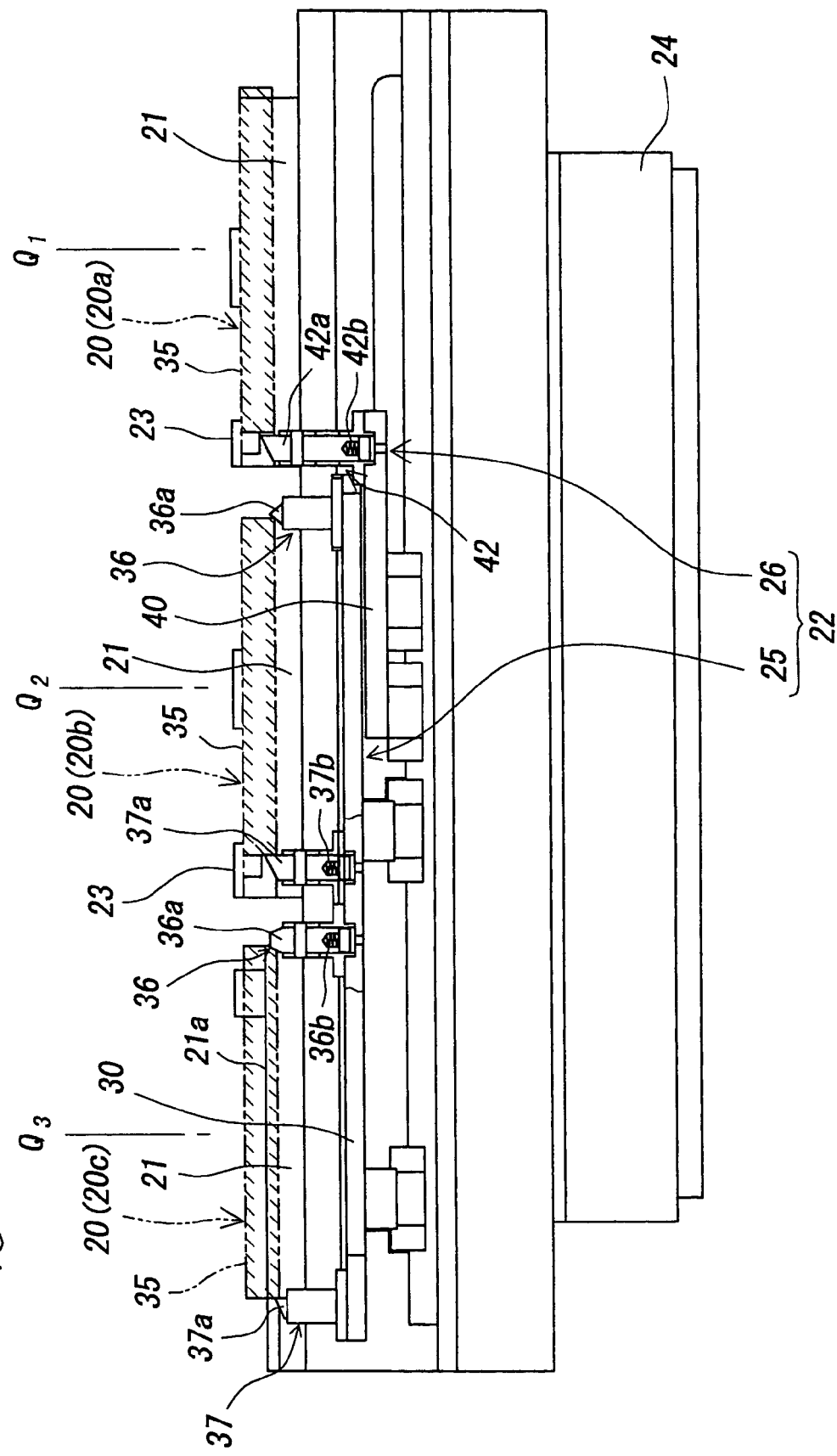
FIG. 19 is a side view partly in section of the carrying section.
Figure 20:
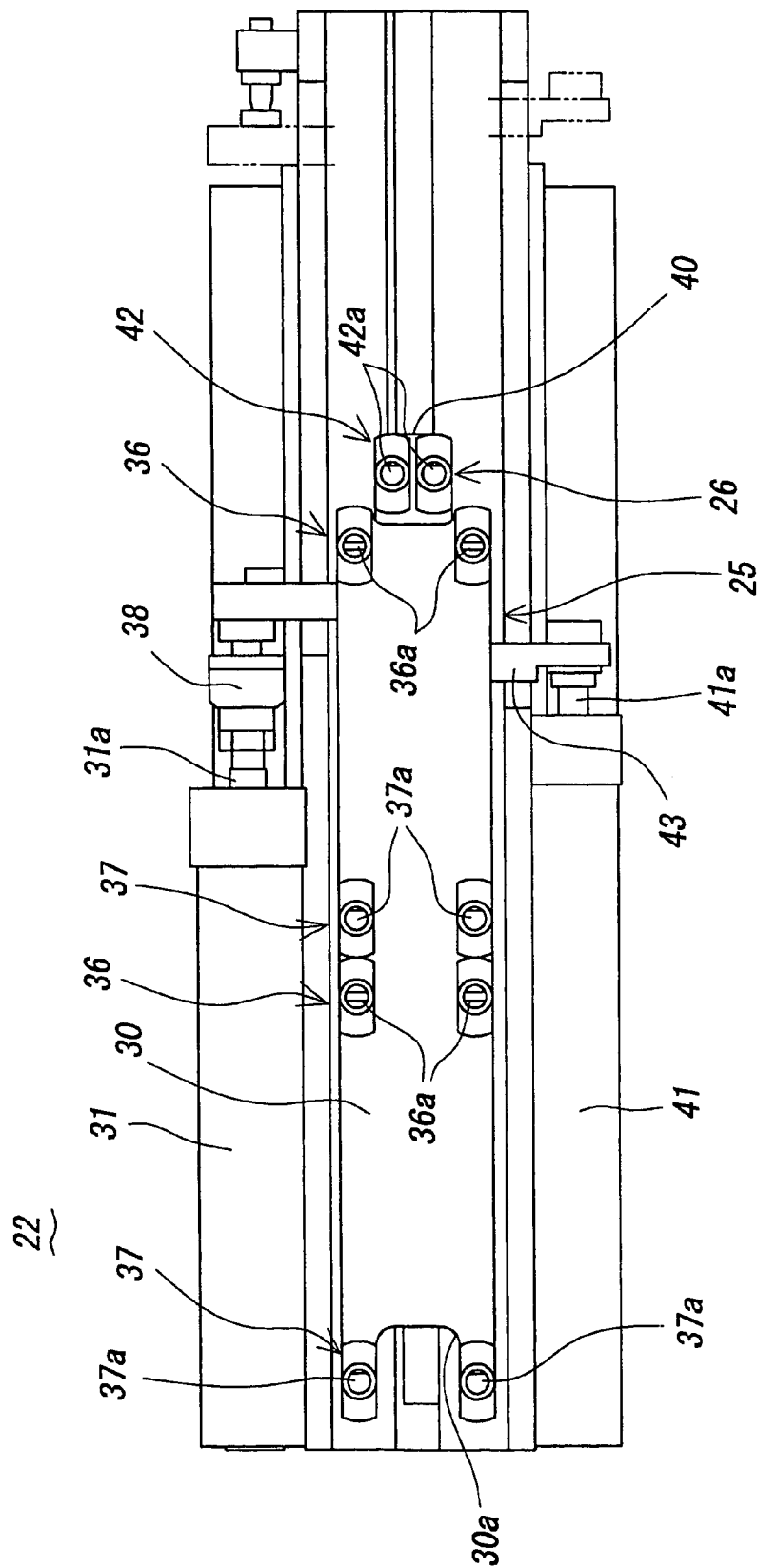
FIG. 20 is a plan view partially broken away of the carrying section.
Figure 21:
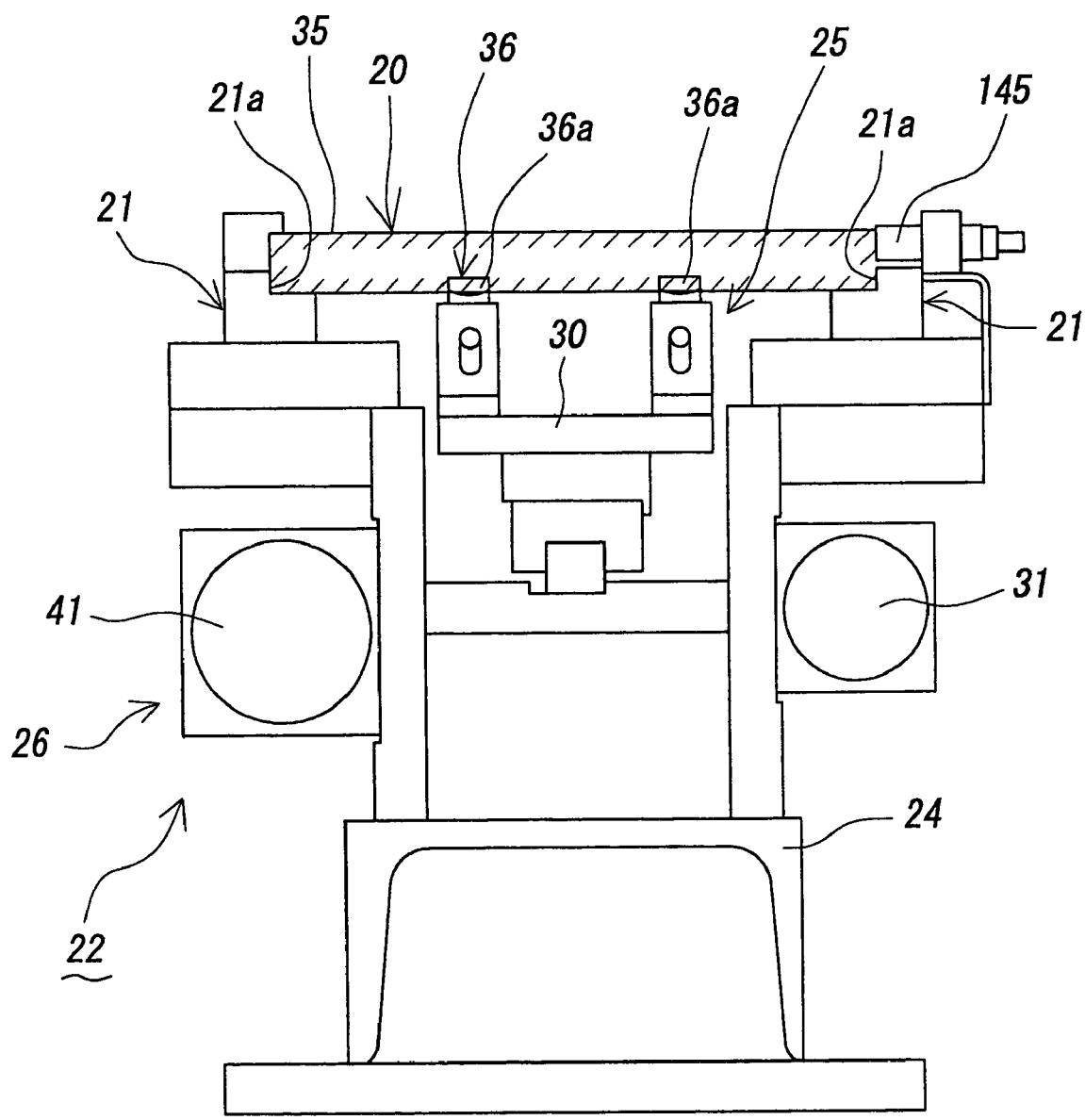
FIG. 21 is a front view showing the carrying section.

As shown in FIG. 15 and FIG. 16, oil pressure unit 202 including hydraulic oil tank 201 being the drive source of honing machine 5 (5b, 5c) of machining cell A (A2, A3) is installed in the frame 101 of each machining cell A (A2, A3), and cutting oil tank 204 for feeding necessary cutting oil for machining is installed at the rear bottom of the frame 101 of each machining cell A.

The machining cell A (A1, A2, A3) having such configuration is at least connected by using one of the carrying rail 21 of the carrying section 11 at the carrying device 10 and the feedback rail 45 of the feedback section 12 as a reference position.

In the preferred embodiment shown, both of these rails 21, 45 function as reference positions, and with these rails 21, 45 arranged so as to form a part of the straight portion of the work carrying passage 1, as in FIG. 1, the machining cells A (A1, A2, A3) are positioned on the installation floor 250, thereby setting up the honing section of the honing system.

Also, at the honing section with a plurality of machining cells A (A1, A2, A3) adjustably disposed and set up in this way, the control units 7a, 7b, 7c of the machining cells A1, A2, A3 are cooperative in predetermined relations, and these machining cells A1, A2, A3 are driven and controlled in mutually interlocked fashion.

Figure 23:
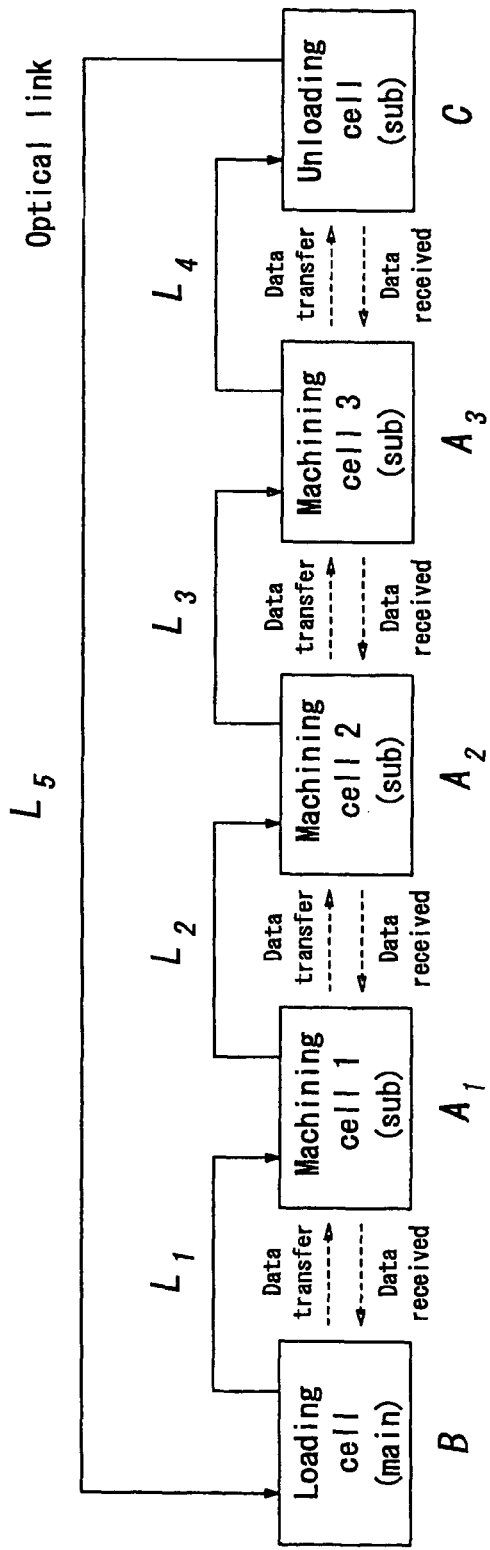
FIG. 23 shows a configuration example of a packet.

Due to such drive and control in mutually interlocked fashion, as shown in FIG. 23, loading cell B, machining cells A1, A2, A3, and communication means 85g of each control unit of unloading cell C are connected to each other in ring form by communication lines L1 to L5 using optical link, enabling data transfer between cells. The reason for employing the communication lines L1 to L5 using optical link is to prevent electromagnetic noise produced by motor or the like from mixing in the data transmitted and received.

The ring-form connection between cells B, A1, A2, A3, C by optical link can be made only by connecting the connector of communication lines L1 to L5 to the socket disposed at the communication means 89 of the control unit of each cell, and the quantity of machining cells A1, A2, A3 can be easily adjusted.

Figure 24:
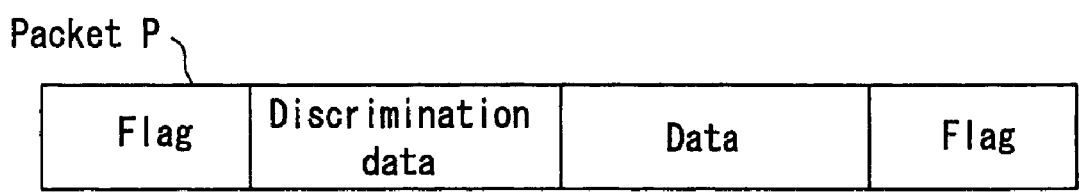
FIG. 24 shows a control unit of a cell bonded in ring form by communication line using optical link.

In this ring-form connection, packet P of a type as shown in FIG. 24, for example, stores data from one cell and it is circulated through cells B, A1, A2, A3, C by one-way communication. Each cell takes in packet P addressed to it and transfers the packet, not addressed to it, to the next cell as it is.

Accordingly, it becomes necessary to include a device for identifying one cell which receives the packet with respect to one packet transmitted so that only the intended cell may receive the data. Particularly, in the present invention, since the quantity of machining cells A1, A2, A3 is adjustable, there is provided a device (configuration) for specifying a transmitting and receiving cell so as to easily cope with the change of the cell arrangement.

Figure 25:
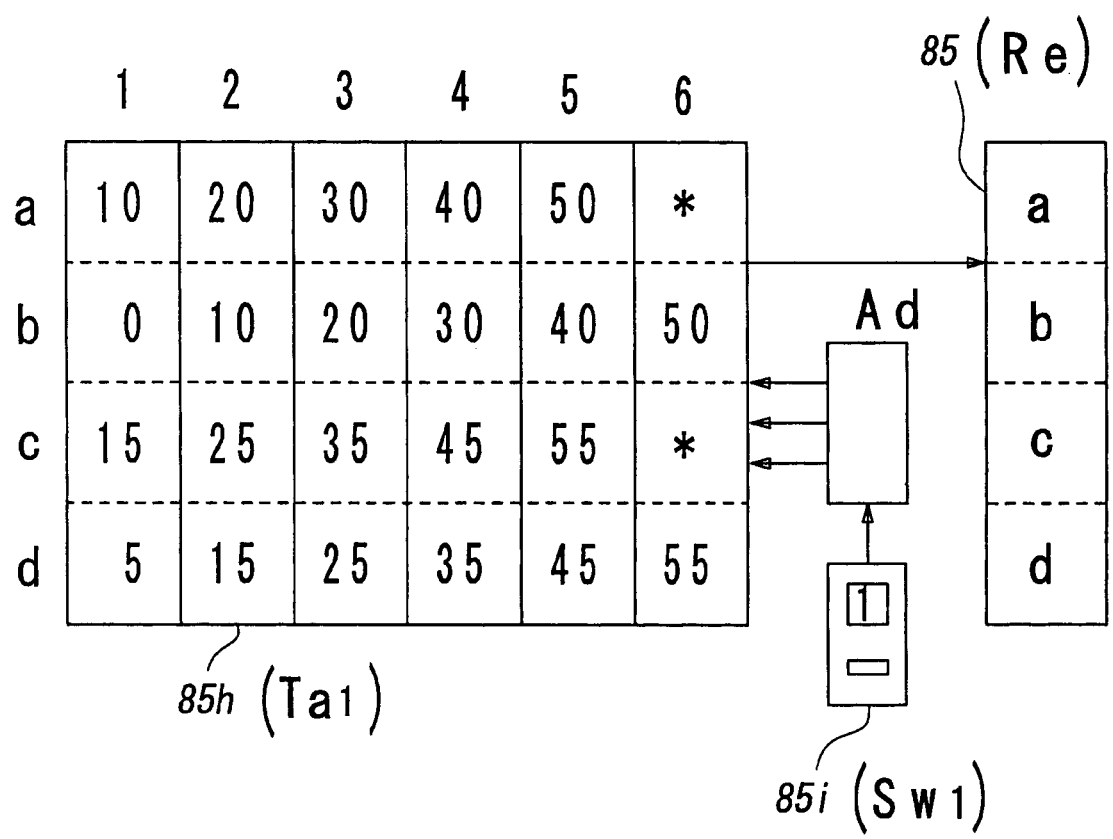
FIG. 25 shows the combination of discrimination data and collation data set in each cell.

An example of basic configuration of this device is shown in FIG. 25. In FIG. 25, reference 85h is operation data storing means, and numeral 85i is position designating means, each of which is built in the control unit 7a as shown in FIG. 12.

The operation data storing means 85h prescribes all groups of discrimination data a, d and collation data b, c set in cells A1, A2, A3, C used as sub-cells with respect to the arrangement (positions 1 to 6 in FIG. 25) at the machining section of the control unit. These data are, for example, stored in ROM in the control unit as numerical data table Ta1. The position designating means 85i serves to input the position number of the relevant cell, specifically, which one is the relevant cell out of the cells A1, A2, A3, C, and in the example shown, digital switch Sw1 is used to achieve the purpose. Since the position is designated in this way, it becomes possible to read the discrimination data a, d and collation data b, c of the designated position into the storing section Re of main control unit 85 shown in FIG. 12.

In the operation data storing means 85h of FIG. 25, reference a is discrimination data attached to the packet transmitted to the upstream side, reference b is collation data for detecting discrimination data a included in the packet sent from the downstream side, reference d is discrimination data attached to the packet transmitted to the downstream side, and reference c is collation data for detecting discrimination data d included in the packet sent from the upstream side.

Since the quantity of machining cells A1, A2, A3 is increased or decreased, the groups of discrimination data a, d and collation data b, c in the data table Ta1 of FIG. 25 are prepared in anticipation of increase in quantity of the cells, which are numbered starting from 1 in the process order of cells.

The loading cell B, main cell, is always used in the foremost process, and the values of the group of discrimination data a and collation data c are fixed, therefore the values are directly set in the control unit 7a.

The groups of discrimination data a, d and collation data b, c of FIG. 25 are determined so that the discrimination data a, d and collation data b, c do not overlap at each cell or in the up and down direction of communication with respect to all the communication at the honing machine.

That is, the groups of discrimination data a, d and collation data b, c of FIG. 25, as shown in FIG. 23, prescribes with respect to the communication established by the honing machine only between adjacent cells at the front and rear stages, but when necessary to execute communication between cells which are not adjacent to each other, it is preferable to add discrimination data and collation data that prescribes their relation.

According to the configuration as described above, packet P with inherent discrimination data added is transmitted to the cell, and the packet P with the discrimination data added is detected by the collation data of the adjacent cells, and thereby, it is possible to identify one cell that should receive the data with respect to one packet P transmitted.

Also, since a position designating means is disposed in each cell A1, A2, A3, C even when the cell arrangement is changed, for example, increasing or decreasing the cells, it is easy to re-set the discrimination data a, d and collation data b, c and to increase or decrease the cells.

With the cells newly installed or the arrangement at the machining section decided according to the replacement or addition of cells, the positions are designated by the position designating means 85i at the cells A1, A2, A3. In the configuration of FIG. 25, serial numbers starting from 1, for example, 1 for cell A1, 2 for cell A2, 3 for cell A3, and 4 for cell A4, are designated by digital switch Sw1 in accordance with the order of cells arranged. Thus, the control unit of each cell reads the group of discrimination data a, d and collation data b, c from the data table Ta1 into storing section Re in accordance with the designation by digital switch Sw1. The discrimination data a, d and collation data b, c to be used at cells A1, A2, A3, C are shown in FIG. 26.

The arrow shown in FIG. 26 stands for the relations of discrimination data and collation data. For example, cell A1 transmits packet P with discrimination data a of value 10 added, and cell A2 detects it with collation data b of value 10 and takes the data out of packet P.

In the example of basic configuration described in FIG. 25 and FIG. 26, two discrimination data a, d are set in one cell. This is intended to discriminate between up and down. If each cell is provided with common up information B1 and down information B0, the amount of data that prescribes the operation data storing means 85h can be decreased. It is shown in FIG. 27.

Figure 27:
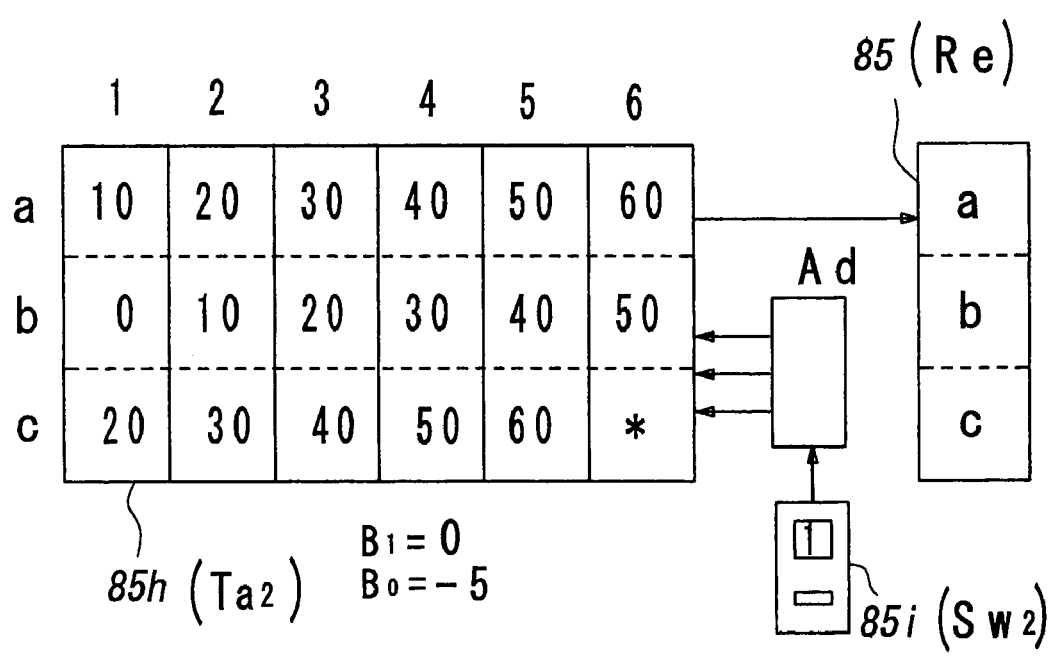
FIG. 27 shows a configuration example of a packet for setting the serial number in accordance with the arrangement of the cells.

In the example of specific configuration shown in FIG. 27, the up information common to each cell is b1=0, the down information is b0=−5, and discrimination data a and collation data b, c are set in the control unit of each cell B, A1, A2, A3, C.

In FIG. 27, reference 85h is operation data storing means and reference 85i is position designating means, which are built into the control unit 7a as shown in FIG. 12.

The operation data storing means 85h prescribes all the groups of discrimination data a and collation data b, c set in cells A1, A2, A3, C used as sub-cells with respect to the arrangement (positions 1 to 6) in the machining section of the control unit. These data are, for example, stored in ROM in the control unit as numerical data table Ta2. The position designating means 85i serves to input the position number of the relevant cell, specifically, which one is the relevant cell out of the cells A1, A2, A3, C, and in the example shown, digital switch Sw2 is used to achieve the purpose. Since the position is designated in this way, it becomes possible to read the discrimination data a and collation data b, c of the designated position into the storing section Re of main control unit 85 of FIG. 12.

Figure 28:
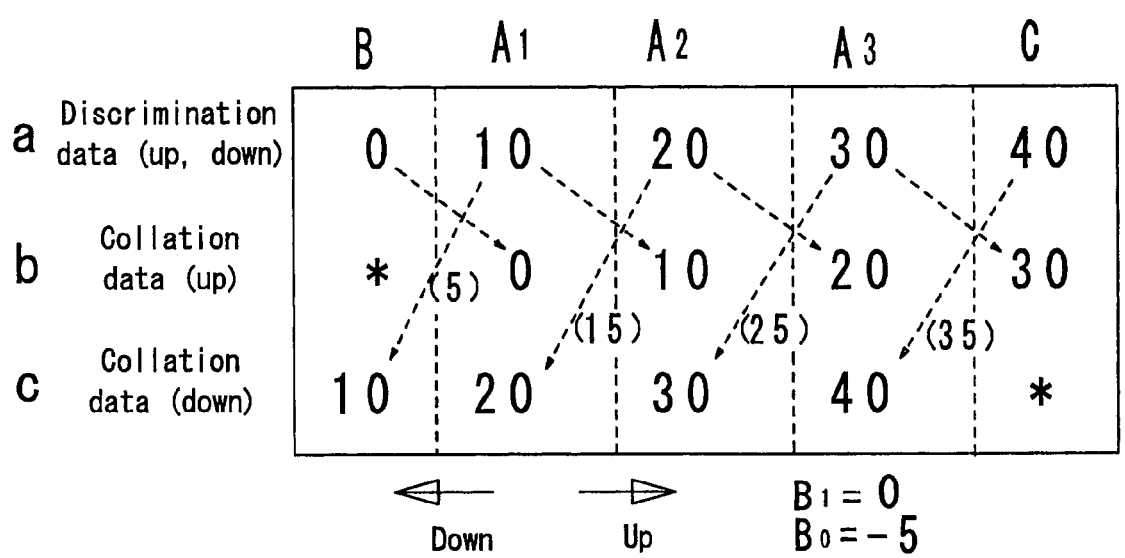
FIG. 28 shows the combination of discrimination data and collation data set in each cell in use of common up information and down information.

The discrimination data a and collation data b, c read into the storing section Re of cell A1, A2, A3, C whose position is designated by the position designating means 85i in the configuration of FIG. 27 are shown in FIG. 28.

In the example of specific configuration, up information is b1=0 and down information is b0=−5, which are used in combination with discrimination data a and collation data b, c. In this case, the relations of discrimination data a and collation data b, c are shown by arrows in FIG. 28.

In FIG. 28, the discrimination data a is added to the up information B1 in transmission to the upstream side, added as B1+a to packet P, and in transmission to the downstream side, it is added to the down information B0, added as B0+a to packet P. The collation data b, added to the up information B1 as B1+b, detects the discrimination data B1+a included in packet P transmitted from the downstream side. The collation data c, added to the down information B0 as B0+c, detects the discrimination data B0+a included in the packet transmitted from the upstream side. The relations of the transmission and reception are shown by arrows in the figure. In this way, it is possible to identify one cell that should receive the packet P.

The communication procedure of each cell A1, A2, A3 in the example of specific configuration of FIG. 27 and FIG. 28 using the operation data storing means 85h represented by the data table Ta2 will be described with respect to the flow chart of FIG. 30. The communication means of cells A1, A2, A3 are common in operation, and since the operation is executed in parallel fashion at the same time, the common operation is provided with same step number.

In the step 1 through step 6, the control unit of each cell A1, A2, A3 reads the discrimination data a and collation data b, c out of the data table Ta2 according to the process order set by the digital switch Sw2.

Figure 30:
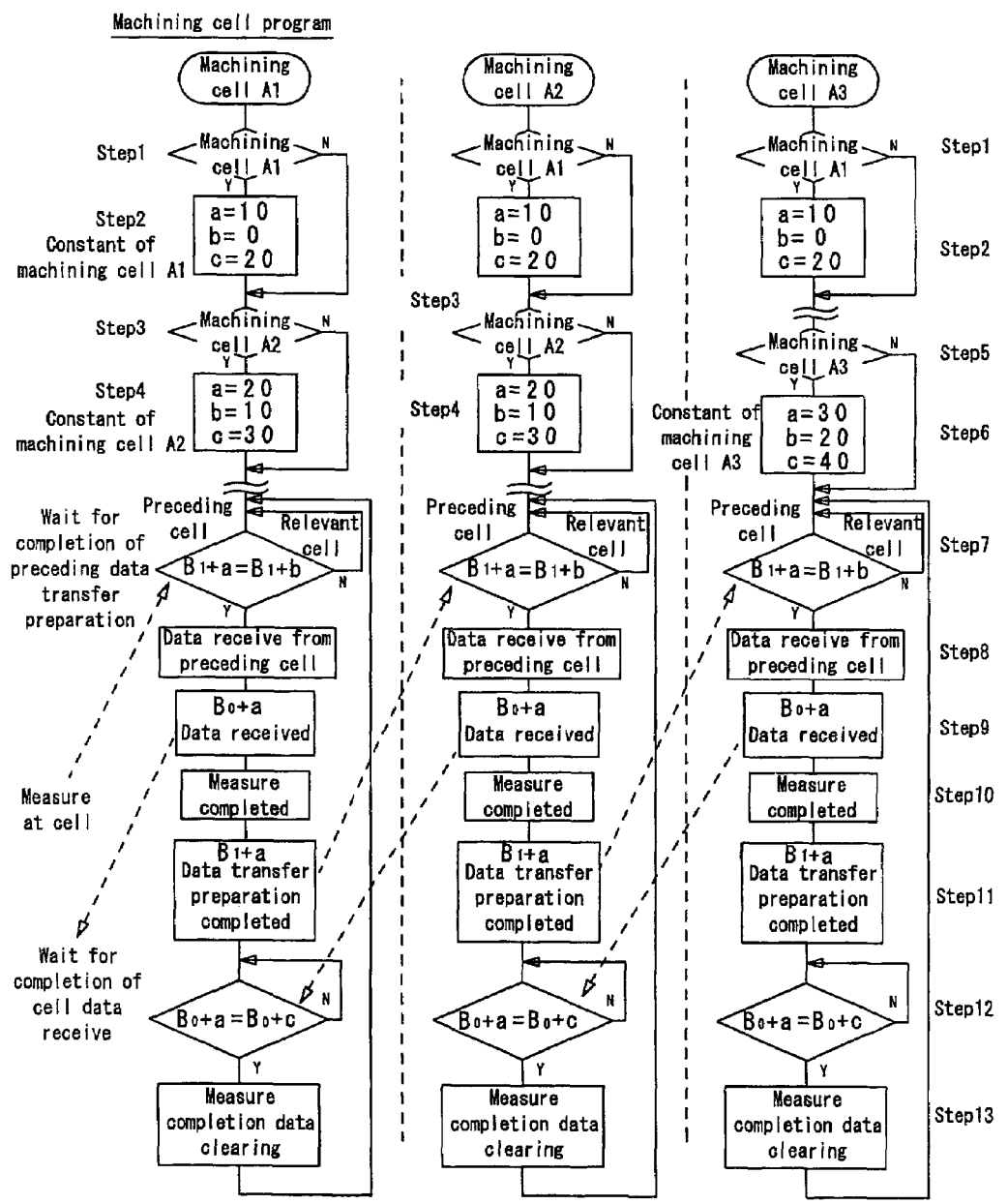
FIG. 30 is a flow chart showing the operation of the control unit of the cell in the configuration of FIG. 29.

In the flow chart of FIG. 30, steps 5 and 6 are not shown with respect to machining cells A1 and A2, while steps 3 and 4 are not shown with respect to machining cell A3.

The control unit of each cell A1, A2, A3 collates to check whether machining cell A1 is designated by the digital switch Sw2 of the relevant cell in step 1, and if so, it reads the constant a=10, b=0, and c=20 of the machining cell A1 in step 2.

Subsequently, in step 3, it collates to check whether machining cell A2 is designated by the digital switch Sw2 of the relevant cell, and if so, it reads the constant a=20, b=10, and c=30 of the machining cell A2 in step 4.

Subsequently, in step 5, it collates to check whether machining cell A3 is designated by the digital switch Sw2 of the relevant cell, and if so, it reads the constant a=30, b=20, and c=40 of the machining cell A3 in step 6.

In this way, the discrimination data a and collation data b, c are read in the communication means of each cell, then the following communication processing during machining of work W is executed. The communication processing is common to the cells A1, A2, A3.

Firstly, in step 7, it waits for completion of the data transfer preparation of the preceding cell. This is to detect that the preceding cell which transmits the measuring data transmits B1+a with discrimination data a to the up information B1, adding it to packet P with data stored therein. Each cell takes the B1+a out of the packet P and compares it with B1+b that is the value with collation data b of its own added to the up information B1. If they correspond with each other, it will be judged that the data transfer preparation of the preceding cell has been completed. And, in step 8, the data of the packet P is read as data transmitted for the preceding cell. The data thus read is transmitted from the preceding cell in the timing and is handled as the data of the work placed on the honing jig 20 detected by the proximity switch 145.

In step 9, the completion of data reception is informed to the preceding cell. That is, B0+a with discrimination data a added to down information B0 is added to packet P and the answer is transmitted.

Also, in step 10, the communication means of each cell waits for the measurement of measuring device 6a after honing. With the measurement completed, in step 11, B1+a with discrimination data a added to up information B1 is added to the packet P storing the measured data, which is then transmitted.

In step 12, it waits for the answer, which informs the completion of reception of the measured data, replied from the next cell.

That is, the packet P storing the measured data is judged that the data transfer preparation of the preceding cell has been completed according to the processing procedure in the step 7 at the communication means of the next cell, and after reading the measured data in step 8, answer packet P with B0+a added in step 9 is returned.

The B0+a is compared with B0+c, value with collation data c added to down information B0, and with their correspondence detected, it is judged that the measured data transmitted has been received by the next cell. And, in step 13, the measurement result is cleared to get ready for the next data transfer.

The method of prescribing the operation data in operation data storing means 85h is functional with the serial number of cell being variable, which can be set in the control unit 7a.

For example, the method is to utilize the fact that the numeric values in the data table of the operation data storing means 85h of FIG. 27 can be represented by (m+n)×10 [where, m is serial number, n is whole number determined by the kind of data of data table].

Also, discrimination data a, d and collation data b, c are preferable that the discrimination data a, d can be detected by the collation data b, c, which are not required to be same in value. It is also preferable to use character data (character codes) instead of presenting by numerical values.

Figure 29:
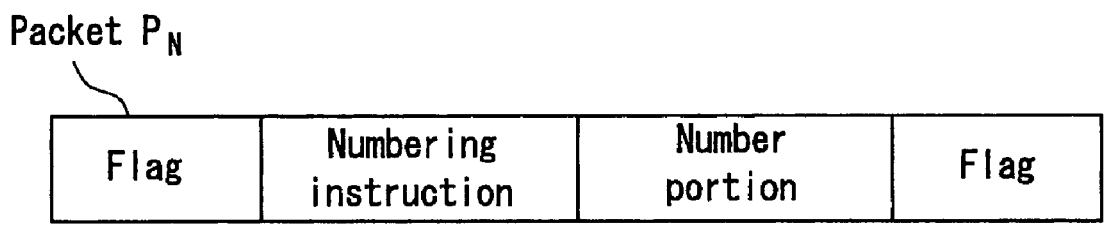
FIG. 29 shows a configuration example in which one combination of discrimination data and collation data registered in a data table is designated by a digital switch and used at the control unit of the cell in use of up information and down information.

The setting of continuous numbers in accordance with the cell arrangement can also be automatically made without using the digital switch Sw1, Sw2 that is the position designating means 85i. This is executed by the control unit of the loading cell B used as main cell, which transmits the numbering instruction and packet PN having a number section with initial value being 1 as shown in FIG. 29.

The control unit of each cell, receiving the packet PN, takes in the numerical value stored in the number portion as its number, then adds 1 to the numeric value of the number portion and transfers it to the next stage. The control unit of unloading section C at the final position adds 1 to the number then taken in and returns it to the control unit of the loading section B. The control unit of the loading section B displays the numerical value of the number section of the returned packet as the total number of cells. By confirming that the actual number of cells corresponds to this, it is possible to find out that the continuous numbers have been set in all cells.

The loading cell B has a unit structure including carrying device 211 forming a part of the work carrying passage 1, and in the preferred embodiment shown, besides the carrying device 211, there are provided the work feeder 2 and work loading/unloading robot 3.

The carrying device 211 comprises carrying rail 215 for carrying the work W to be machined and loader 217.

The carrying rail 215 is nearly same in structure as the carrying rail 21 of machining cell A1, A2, A3 described above, and the detailed description is omitted. The carrying rail 215 ranges from loading position P1 in the work carrying passage 1 to the inlet P2 of the honing section.

The loader 217 serves to carry the honing jig 20 from the loading position P1 to the inlet P2 of the honing section or to the detecting position of under-bore detector 4, and specifically, it comprises an air cylinder unit.

The work feeder 2 serves to feed the work W to the receiving position of the work loading/unloading robot 3, and specifically, work W, W, ... to be machined are neatly arranged on the carrying pallet and sequentially continuously carried to the receiving position and then wait for the work loading/unloading robot 3.

The work loading/unloading robot 3, although it is not specifically shown, is of conventionally well-known structure, which comprises a main body of rocking arm type and a work chuck of collet chuck type. And, the work chuck operates vertically and contracts and expands at the receiving position of the work feeder 2 and the loading position P1 in order to attach and detach the work W, and also horizontally carries the chucked work W between these positions and rotates the work W around the vertical shaft in the honing jig 20 at the work loading position P1.

The unloading cell C has a unit structure including carrying device 221 forming a part of the work carrying passage 1, and in the preferred embodiment shown, besides the carrying device 221, there are provided brush 222 and air blower 223.

The carrying device 221 comprises feedback rail 224 for returning the work W to be machined and unloader 225.

The feedback rail 224 is nearly same in structure as the carrying rail 21 of machining cell A1, A2, A3 described above, and the detailed description is omitted. The feedback rail 224 ranges from unloading position P3 in the work carrying passage 1 to the feedback position P4.

The unloader 225 serves to carry the honing jig 20 from the unloading position P3 to the feedback position P4, and specifically, it comprises an air cylinder unit.

The brush 222 and air blower 223 serve to clean the machining surfaces of work W machined by brushing or blowing air, which are respectively installed at the unloading position P3 and feedback position P4.

Thus, the work carrying passage 1 comprising the loading cell B, machining cells A1, A2, A3, and the carrying rails 215, 21, 21 and 21 of unloading cell C, feedback rails 224, 45, 45 and 45 is configured, as shown in FIG. 1, in rectangular loop form starting from the work loading position P1 to the under-bore detector 4, precision boring machine 5a, measuring device 6a for boring, honing machine 5b for middle machining, measuring device 6b for middle machining, honing machine 5c for finish machining, and going back to the work loading position P1 via the loading position P3 and feedback position P4 through measuring device 6c for finish machining.

Figure 31:
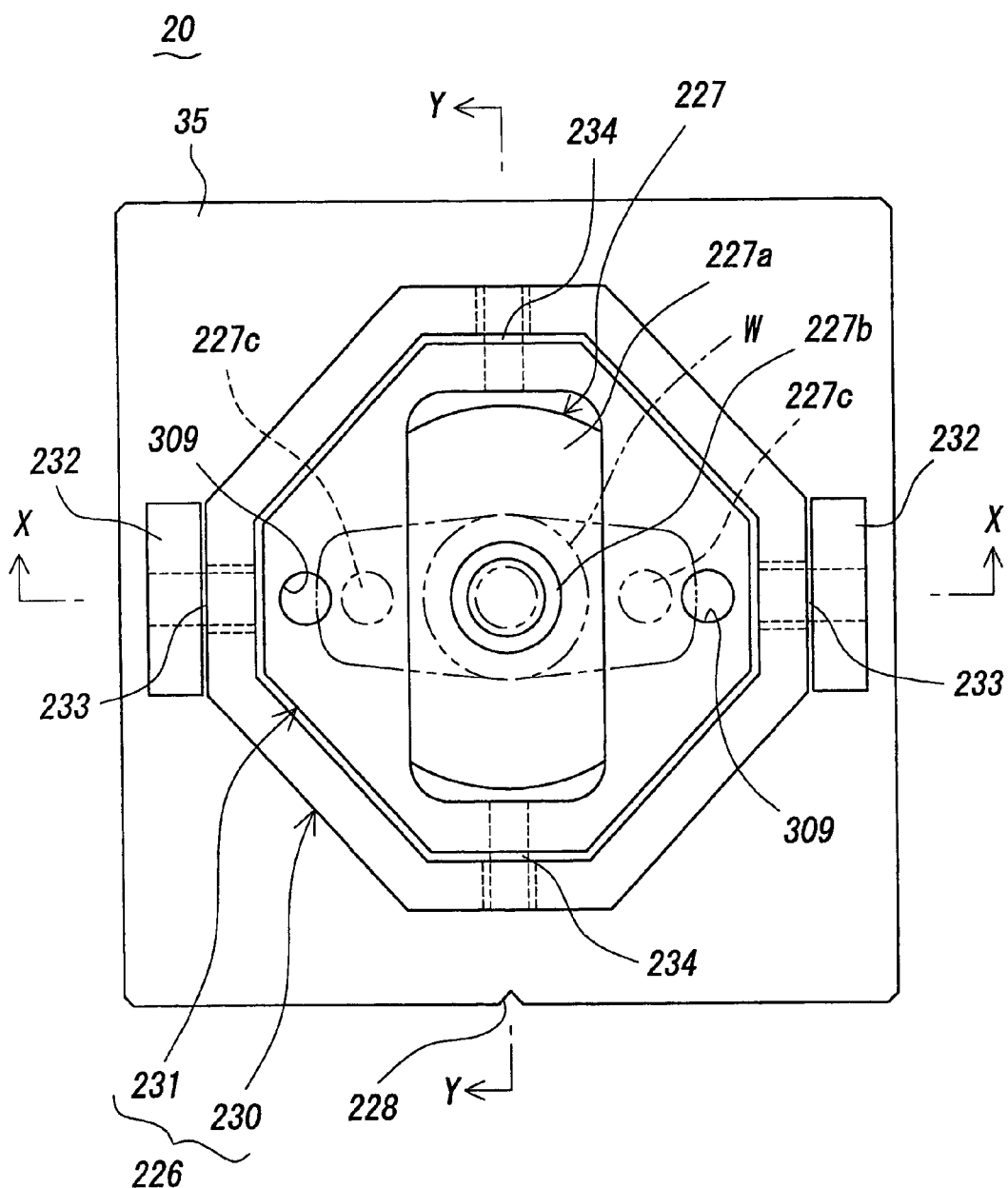
FIG. 31 is a plan view showing a honing jig used in the automatic honing system.
Figure 32:
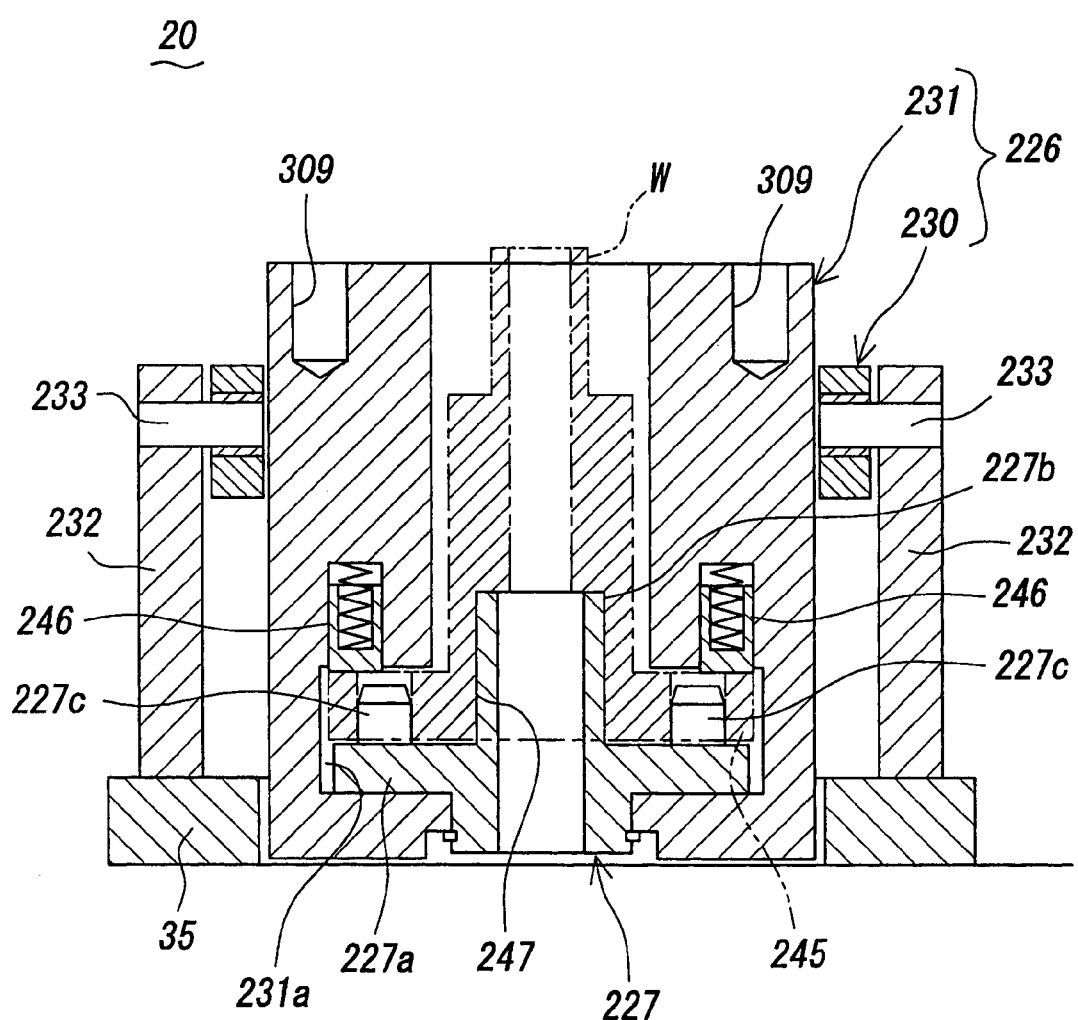
FIG. 32 is a longitudinal sectional view of the honing jig shown along the X-X line of FIG. 31.
Figure 33:
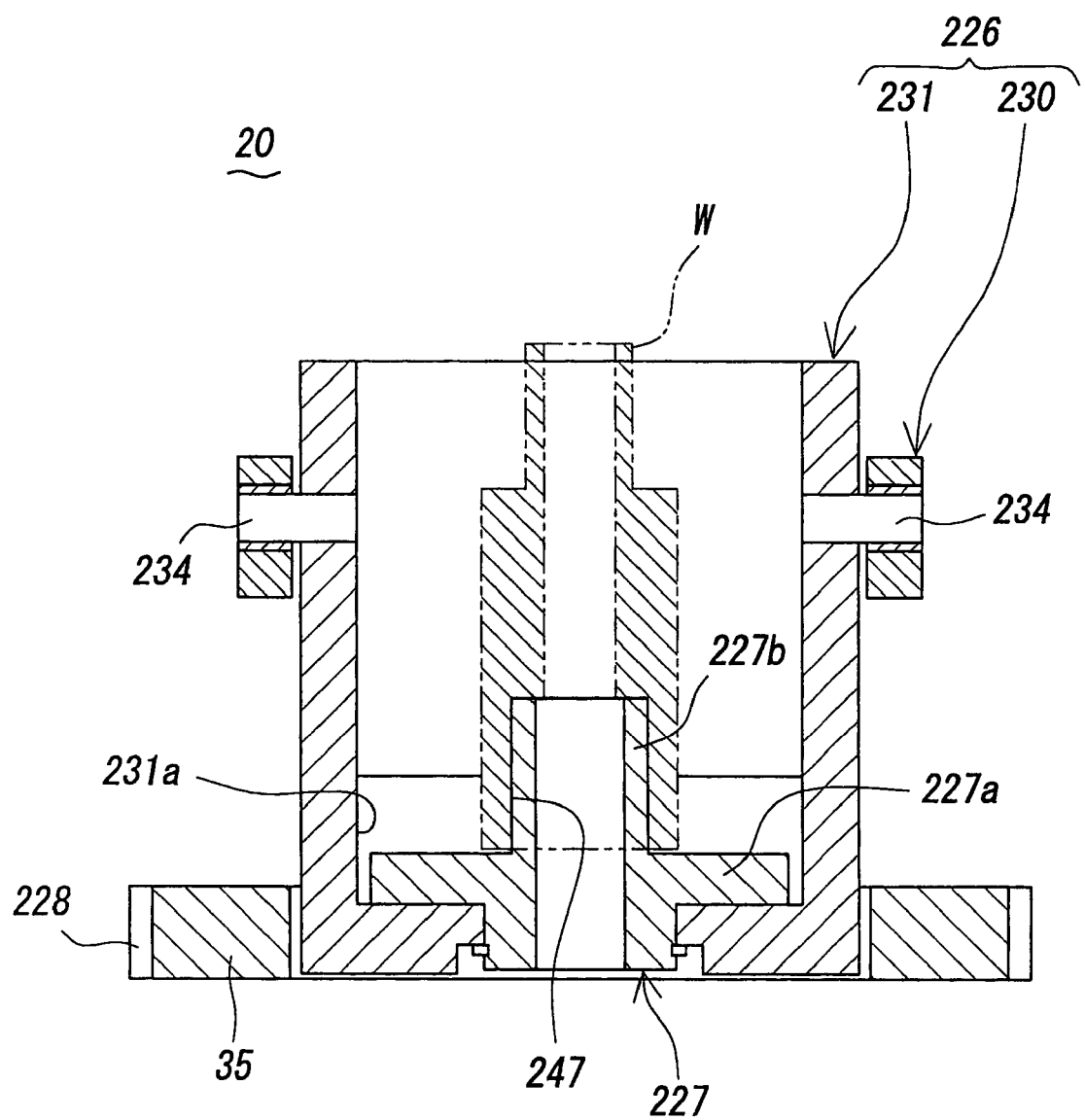
FIG. 33 is a longitudinal sectional view of the honing jig shown along the Y-Y line of FIG. 31.
Figure 34A:
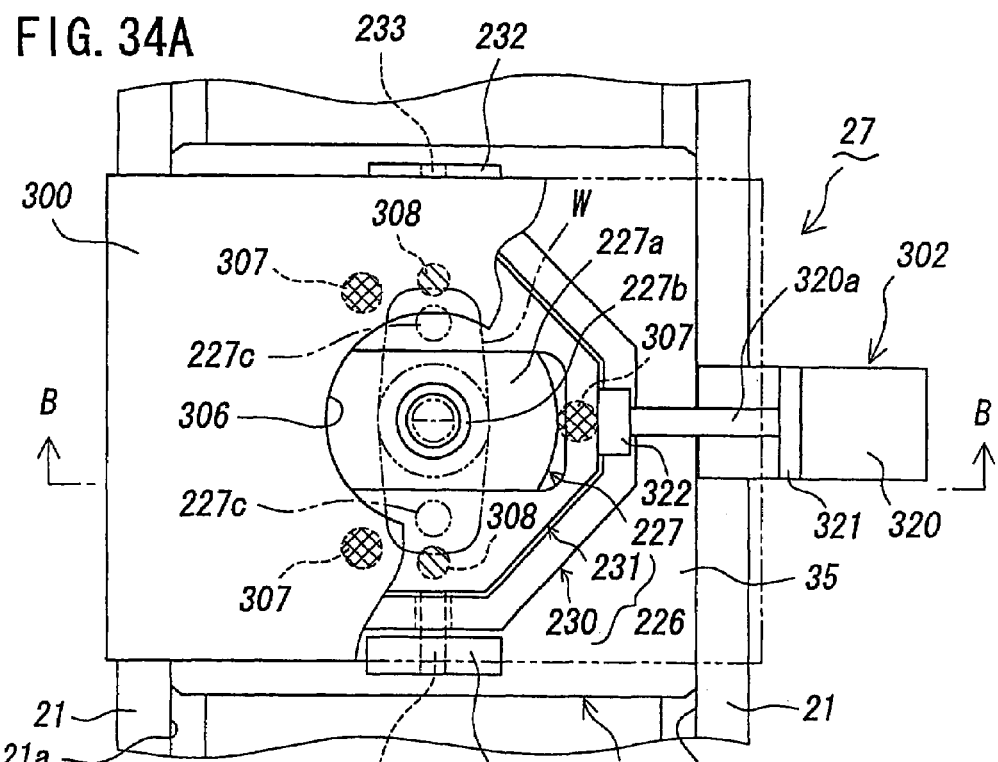
FIG. 34(a) is a plan view partially broken away of the relationship between the honing jig and the locking device.
Figure 34B:
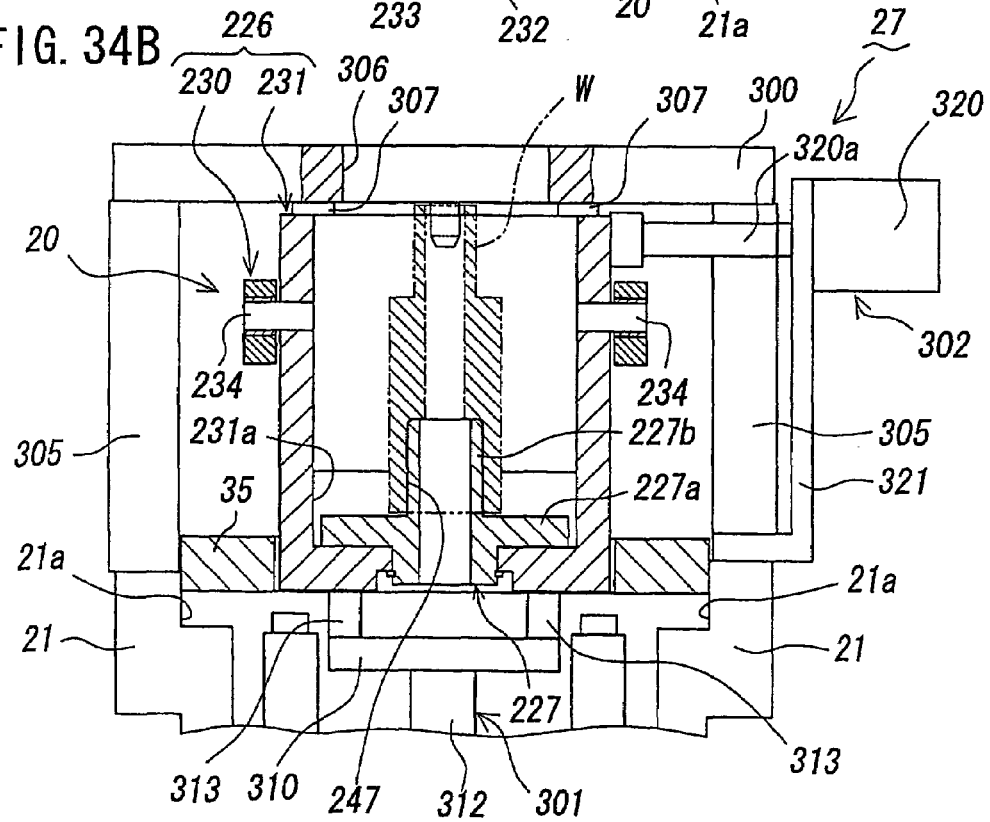
FIG. 34(b) is a sectional view along the B-B line of FIG. 34(a).

Also, the honing jig 20 carried in the work carrying passage 1, holding the work W, comprises main components such as jig base (or pallet) 35, rocking body 226, and work holder 227, as shown in FIG. 31 to FIG. 33.

Figure 35A:
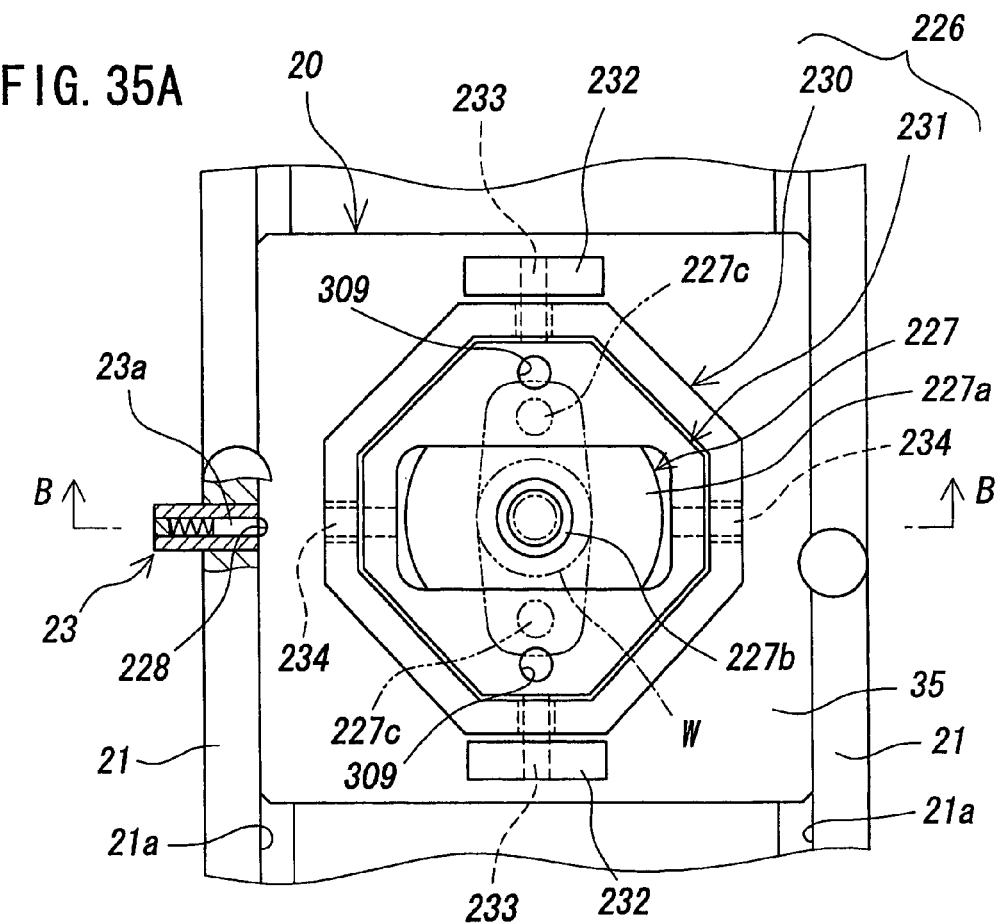
FIG. 35(a) is a plan view partially broken away of the relationship between the honing jig and the positioning device.
Figure 35B:
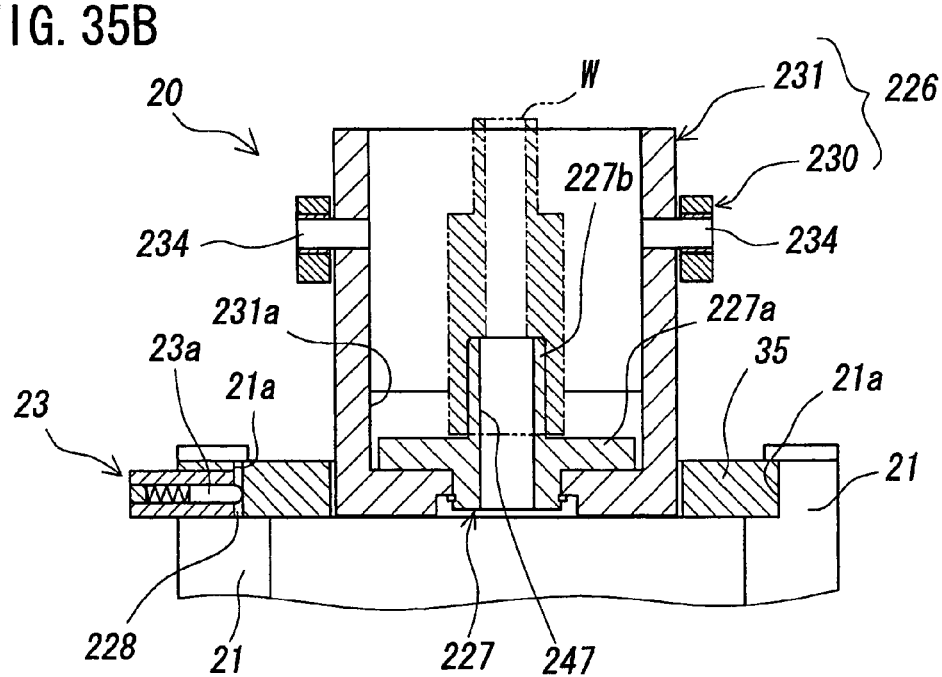
FIG. 35(b) is a sectional view along the B-B line of FIG. 35(a).
Figure 36:
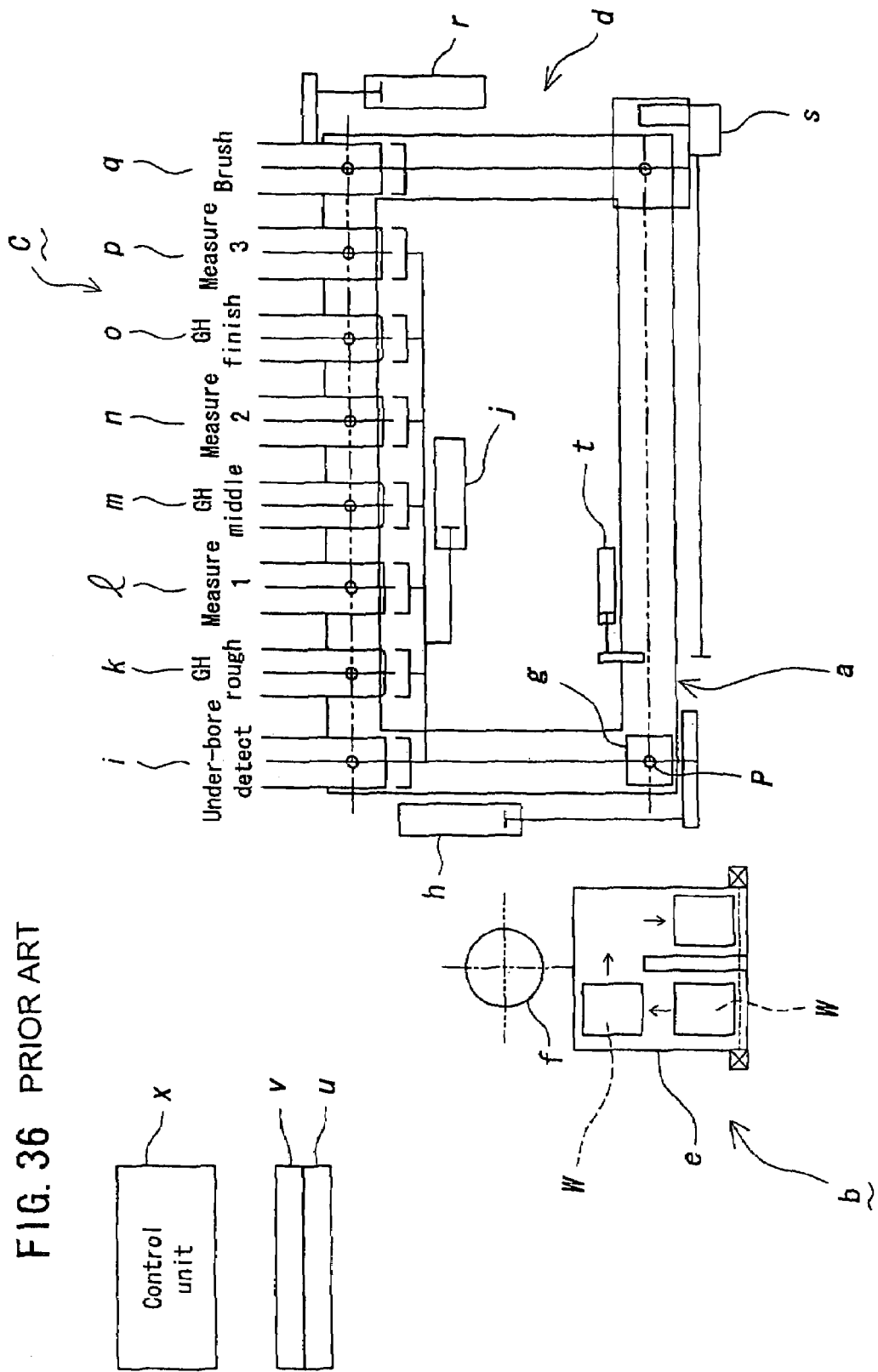
FIG. 36 is a plan view showing the general configuration of a conventional automatic honing system.

The jig base 35 is generally square in plane as shown in FIG. 31, which is movably disposed in the work carrying passage 1 as described above. There is provided stop recess 228 in the middle of one side of the jig base 35, and the stop recess 228 resiliently engages the positioning device 23 of the work carrying passage 1 at the machining cell A2, A3 as shown in FIG. 35.

That is, the positioning device 23 of machining cell A2, A3 is, for example, a type of positioning plunger 23a using a straight core pin or stop ball as a stop portion, which is installed at the machining position Q2 of each honing machine 5 (5b, 5c) and the measuring position Q1 of measuring device 6 (6b, 6c). And, the stop portion 23a of each positioning device 23 resiliently engages the stop recess 228 of the jig base 35, thereby positioning the honing jig 20.

On the other hand, the positioning device 23 of machining cell A1 is a type of positioning cylinder 23b at the front side thereof, and a type of positioning plunger 23c using a straight core pin or stop ball as a stop portion at the rear side thereof. These front and rear positioning devices 23b, 23c come to engage the front and rear ends of the jig base 35, thereby positioning the honing jig 20.

The rocking body 226 is disposed on the jig base 35 and able to rock in three-dimensional directions, which comprises first rocking member 230 and second rocking member 231.

The first rocking member 230 is suspended and able to rock on the support posts 232, 232 of the jig base 35 via X-cross pins 233, 233, and outside the first rocking member 230, the second rocking member 231 is suspended and able to rock via Y-cross pins 234, 234 perpendicularly crossing the X-cross pin In this way, the second rocking member 231 is subjected to the motion (rotation about X-X axis) of the X-cross pins 233, 233 and the motion (rotation about Y-Y axis) of the Y-cross pins 234, 234, and is able to rock in three-dimensional directions. Consequently, as described later, it is possible to maintain excellent and uniform follow-up to honing tool 160, thereby preventing the difference in machining accuracy and realizing highly accurate honing.

Also, the work holder 227 serves to position and hold the work W, which is removably and horizontally rotatably installed on the second rocking member 231 of rocking body 226, and it is structurally able to cope with the dimensional change of work W to be machined.

The work holder 227 is configured, as shown in FIG. 32 and FIG. 33, in that cylindrical work holding portion 227b which supports the work W from underneath is disposed upright and integrally in the center of disk-like holder body 227a, and also, stop pins 227c, 227c for stopping the work W in the diametrical position of holder body 227a are disposed upright and integrally.

Also, corresponding to the work holding structure of work holder 227, at the bottom of the second rocking member 231, there is provided housing space 231a in which the holder body 227a of work holder 227 and the flange portion 245 of work W are horizontally rotatably housed, and at the ceiling thereof, there is provided plunger 246, 246 which resiliently energizes the flange portion 245 of the work W.

Thus, although it is not specifically shown, work W is placed on the work holder 227 in such manner that the work W is chucked by the work loading/unloading robot 3, and while the hole of the flange portion 245 of the work W is slipped into the stop pin 227c, 227c of the work holder 227, lower hole 247 is slipped into the work holding portion 227b from above, and in this condition, the work W is rotated around the axial line of the work holding portion 227b along with the work holder 227, then the plungers 246, 246 are resiliently stopped to keep the status. On the other hand, the work W is automatically removed from the work holder 227 by means of the work loading/unloading robot 3 according to the procedure entirely opposite to the above procedure.

Also, as to the honing jig 20, as described above, due to the rocking motion in three-dimensional directions of the rocking body 226, the work W maintains excellent and uniform follow-up to the honing tool 160 of honing machine 5b, 5c, thereby assuring highly accurate honing, but on the other hand, it is necessary to keep the work W in a state of being fixed with respect to the boring bar 60 of precision boring machine 5a.

In order to achieve the purpose, as described above, at the machining position Q2 of the precision boring machine 5a, there is provided locking device 27 which serves to keep the work W on the honing jig 20 positioned by the positioning device 23 in a state of being fixed.

The locking device 27 serves to secure the rocking body 226 of the honing jig 20, and in the preferred embodiment shown, it is structured to secure the second rocking member 231.

That is, the locking device 27 comprises main components such as jig positioning base 300, jig lifting device 301, and jig fixing device 302.

The jig positioning base 300 serves to position the second rocking member 231 of the honing jig 20, which is horizontally disposed on the carrying rail 21 of carrying section 11 by means of four support posts 305, 305, . . . .

In the center of the jig positioning base 300, there is provided insertion hole 306 into which the boring bar 60 of precision boring machine 5a can be inserted. Also, on the underside of the jig positioning base 300, there are provided a plurality (three in the figure) of reference positioning bases 307, 307, 307 for leveling the second rocking member 231, with which the top end of the second rocking member 231 comes into contact to be supported. Further, on the underside of the jig positioning base 300, there are provided a plurality (two in the figure) of positioning pins 308, 308 opposing to each other for horizontal positioning, and corresponding to these, there are provided positioning holes 309, 309 at the top end of the second rocking member 231, into which the positioning pins 308, 308 are inserted, thereby horizontally positioning the second rocking member 231.

The jig lifting device 301 serves to lift the honing jig 20 vertically upward, which is disposed between the carrying rails 21, 21 of the carrying section 11. The jig lifting device 301 comprises main components such as push-up stand 310 and push-up cylinder 311.

The push-up stand 310 located between the carrying rails 21, 21 is horizontally supported at the top end of up-and-down moving rod 312 journaled on the carrying section base 24 in such manner as to be vertically movable. The push-up stand 310 is formed in nearly disk-like shape and provided with three push-up members 313, 313, 313 at the top thereof.

And, stop pins 313a, 313a, 313a at the top are inserted into stop holes (not shown) disposed in the bottom of the second rocking member 231.

Also, the lower end of the up-and-down moving rod 312 is coaxially connected to the piston rod 311a of the push-up cylinder 311 via coupling 314, and the push-up cylinder 311 is fixed on the carrying section base 24.

The push-up members 313, 313, 313 of the push-up base 310, and the positioning pins 308, 308 of the jig positioning base 300 are arranged so as to correspond to each other with respect to horizontal positions. In this way, the second rocking member 231 supported by the push-up members 313, 313, 313 of the push-up base 310 is configured in that its positioning holes 309, 309 correspond to the positioning pins 308, 308.

The jig fixing device 302 is lifted by the jig lifting device 301 and serves to fix the second rocking member 231 secured by the jig positioning base 300, pushing it in horizontal direction, which comprises air cylinder 320 as main component. The air cylinder 320 is installed on one of the carrying rails 21 by means of bracket 321, and push-pad 322 is fitted to the end of the piston rod 320a.

Thus, the honing jig 20 fed to the machining position Q2 of machining cell A1 is first positioned by the positioning device 23 (positioning cylinder 23b, positioning plunger 23c). After that, the second rocking member 231 is lifted vertically upward by the push-up base 310 of jig lifting device 301 and is fixed on the jig positioning base 300. In this condition, work W held by the second rocking member 231 or work holder 227 is kept in a horizontal state and then positioned horizontally. Simultaneously, the other parts of the honing jig 20 such as the first rocking member 230 and jig base 35 are supported in a state of suspension against the second rocking member 231.

Further, the piston rod 320a of air cylinder 320 of the jig fixing device 302 protrudes and pushes to secure the second rocking member 231 in horizontal direction by means of push-pad 322. In this way, the work W is correctly positioned with respect to the boring bar 60 of the precision boring machine 5a.

Honing with use of an automatic honing system having the above configuration will be described in the following.

I. Loading of Work W:

Work W, W, . . . fed by the work feeder 2 and lined up are sequentially continuously carried to the receiving position, and after that, they are one by one chucked by the work loading/unloading robot 3 and then fitted to the work holder 227 of the honing jig 20 standby at the work loading position P1 of work carrying passage 1 according to the procedure described above. In this way, the work W is kept being able to rock in three-dimensional directions due to the floating structure of the honing jig 20.

II. Automatic Honing of Work W:
i) With the work W completely fitted to the honing jig 20 at the work loading position P1, the loading device 217 is operated to carry the honing jig 20 (hereinafter, work W) to the inlet P2 of the honing section or the detecting position of the under-bore detector 4, where it is positioned by the positioning device 23. After that, the under-bore detector 4 detects the under-bore diameter of machining hole Wa of the work W according to the procedure described above, and the detection result is transmitted to the control unit 7 (7a, 7b, 7c) of the precision boring machine 5a and honing machine 5b, 5c.
ii) In this case, as pre-finishing for honing, precision boring 5a is executed so that the under-bore diameter of machining hole Wa is within the able range of honing, and at the same time, corrections are made with respect to cutting margin increased due to heat or the like, end surface squareness, and concentricity, followed by execution of honing by each honing machine 5b, 5c.

That is, work W positioned at inlet P1 is sequentially fed in tact fashion by the carrying section 11 of each machining cell A (A1, A2, A3) from precision boring machine 5a --> first measuring device 6a for boring --> second honing machine 5b for middle machining --> second measuring device 6b for middle machining --> third honing machine 5c for finish machining --> third measuring device 6c for finish machining, which is also positioned by the positioning device 23 at the position of each device (at the machining position Q1 of precision boring machine 5a, the work holder 227 rocked by the rocking body 226 is further locked by the locking device 27), then the steps (honing by precision boring machine 5a of machining cell A1, honing machine 5b, 5c of machining cell A2, A3, and work machining diameter measurement by measuring devices 6a, 6b, 6c) are sequentially executed. After that, the results (final finishing sizes) of measuring the machining hole Wa of work W by means of the measuring device 6c for finish machining are fed back to the second honing machine 5c and also transmitted as the collation signals of work W to the work sorting device 240.

III. Unloading of Work W:

The work W carried to the unloading position P3 through a series of honing operations is carried by unloading device 125 to the feedback position P4, from which it is again returned to the work loading position P1 by the feedback section 12 of each machining cell A (A1, A2, A3). After that, it is chucked by the work loading/unloading robot 3 and taken out of the work holder 227 of the honing jig 20 according to the procedure described above and ejected into the ejecting chute 241 after being sorted in accordance with the sorting result of the work sorting device 240.

On the other hand, the honing jig 20 with work W removed waits at the work loading position P1 for the next work W fitted by the work loading/unloading robot 3.

Thus, in the automatic honing system configured as described above, work w is subjected to boring executed by boring machine 5a prior to honing executed by honing machine 5b, 5c. Accordingly, more accurate boring can be achieved as compared with a conventional automatic honing system.

That is, since boring operation is so-called copying operation that is executed along the under-bore shape of work W (for example, along the curve if the bore is curved), the finish machining accuracy in the conventional automatic honing system is greatly subjected to the influence of the under-bore machining accuracy.

On the other hand, in the automatic honing system described above, boring is executed by precision boring machine 5a to forcibly cut the under-bore as pre-finishing for honing operation. Accordingly, on the under-bore of work W, corrections are made such as 1) correction of cutting margin increased due to heat or the like, 2) forcible correction regardless of machining accuracy (roundness, cylindricity, etc.), and 3) correction of end surface squareness or concentricity that cannot be forcibly corrected in conventional honing. Consequently, the finish machining accuracy in the automatic honing system described above is not influenced at all by the under-bore machining accuracy of work W, and it is possible to perform more accurate boring with less number of steps.

Also, in the automatic honing system described above, since the machining cells A (A1, A2, A3) connected and arranged, making up the honing section, can be increased and decreased, it is compact, light-weight, and simple in structure, and it is easy to decide or change the number of steps and to design, and moreover, to reduce the installation cost.

That is, the number steps for honing is decided according to the under-bore shape accuracy, cutting margin, and required shape accuracy of the work. Accordingly, as for unstable under-bore shape accuracy and cutting margin in the trial stage, the machining cells A (A1, A2, A3) are installed in the honing section of the automatic honing system in quantity adjustable fashion, and thereby, even when the number of steps cannot be early decided, it will be possible to effectively cope with the problem later.

For the same reasons, even in case of change in under-bore accuracy of work W or change in machining accuracy required for the work W, the number of steps can be readily and easily changed by properly combining the machining cells A (A1, A2, A3) whose quantity is adjustable.

Also, for the same reasons, even when it is difficult to predict the production quantity of work W, the investment can be easily decided taking into account the distribution of steps and the selection of multiple types including the machining cells A whose quantity is adjustable.

Further, the machining cells A (A1, A2, A3) are of unit structure that includes carrying device 10 forming a part of work carrying passage 1, single machine tool (precision boring machine 5a, honing machine 5b, 5c) and control unit 7 (7a, 7b, 7c) for controlling these in mutually interlocked fashion, which are also installed in quantity adjustable fashion. Accordingly, in no need of production of specific work W initially intended, when the cells are used for machining other work W different in shape, size and machining conditions, the purpose can be easily achieved by partly remodeling or changing the system and properly increasing or decreasing the quantity of machining cells A.

Also, since the machining cell A (A1, A2, A3) itself is of unit structure, all of its components such as spindle cooler 103, chip receiver 104, hydraulic unit 102, 202, spindle cooler 103 and cutting oil tank 204 are independent of each other in each machining cell A (A1, A2, A3) and small-sized, which can be installed in the frame 101 of each machining cell A (A1, A2, A3), thereby enabling the simplification and size reduction of the entire system.

The exemplary embodiment described above is just the preferred embodiment of the present invention, and the present invention is not limited to the exemplary embodiment, and it is possible to change the design in various ways.

For example, the data necessary for operation at each position stored in the operation data storing means includes the operation program for the machine tool besides the discrimination data and collation data used for communication. In the honing system equipped with a plurality of honing machines, the honing machines are arranged in the order of rough, middle, and finish machining, and different operation programs are used by the honing machines according to the positions. In order to cope with this, a plurality of operation programs are stored in the operation storing means, and after it is installed in the machining section of the system, necessary operation program is read out of the operation data storing means in accordance with the position designated by the position designating means.

Also, for example, in the preferred embodiment shown, the work carrying passage 1 is arranged in loop form so that the honing jig 20 is again returned to the work loading position P1 from the work loading position P1, but it is also possible to linearly arrange the passage that is continued to the next process. In this case, although it is not shown, for example, work W is fitted to the honing jig 20 at the work loading position and is detached from the honing jig 20 at the work unloading position, then only the honing jig 20 is returned to the work loading position.

The inside configuration of the machining cells A (A1, A2, A3), B, C which make up the honing system and the specific structures of their components are also not limited to the preferred embodiment shown and it is possible to change.

For example, in the machining cells A (A1, A2, A3) in the preferred embodiment shown, the measuring device 6 is arranged in a station independent of the honing machine 5, but the measuring device is also preferable to be integrated with the honing machine 5 and to execute the measurement in the main process.

Also, the preferred embodiment shown is an automatic honing system for machining which comprises machining cell A1 provided with precision boring machine 5*a*, and machining cell A2, A2 provided with honing machine 5*a* or 5*b*, but in the present invention, it is possible to build up various automatic machine tool systems such as those equipped with machine tools of single type or those using machine tools of various types.

As described above in detail, the machining cells of the present invention are of unit structure that includes at least the carrying device forming a part of the work carrying passage, single machine tool, and the control unit for controlling these in mutually interlocked fashion, which are installed in the machining section of the automatic machining system in quantity adjustable fashion, wherein the control unit is equipped with the operation data storing means storing every position necessary data for operation at each position of the cells installed in the machining section, and the position designating means for designating the after-installation position, and after being installed in the machining section of the automatic machining system, the control unit reads data necessary for operation out of the operation data storing means in accordance with the position designated by the position designating means. Accordingly, for example, in the case of an automatic honing system equipped with a honing machine as the machine tool, the system is compact, light-weight, and simple in structure, and it is easy to decide or change the number of steps and to design, and moreover, possible to reduce the installation cost.

Particularly, the control unit of the machining cell comprises the operation data storing means storing every position necessary data for operation at each position of the cells installed in the honing section, and the position designating means for designating the after-installation position, and after the machining cell is installed in the honing section, the data necessary for operation is read out of the operation data storing means in accordance with the position designated by the position designating means. Accordingly, the operation of the machining cell can be changed over according to the position, and it is easy to cope with the position change or quantity increase and decrease of the cells.

The specific preferred embodiment mentioned above in the paragraph of the detailed description of the invention is just intended to make clear the technical detail of the invention, and therefore, the present invention should not be interpreted in a narrow sense, limiting it only to the above specific examples, but it should be interpreted in a broad sense, understanding that it can be changed in various ways within the range of the spirit and claims of the present invention.

What is claimed is:

1. A processing cell of automatic machining system, configuring a machining section of an automatic machining system wherein work is continuously carried at predetermined intervals along a work carrying passage and sequentially continuously machined, which is installed in the machining section of the automatic machining system in quantity adjustable fashion, having a unit structure including at least a carrying device forming a part of the work carrying passage, a single machine tool, and a control unit for controlling these in mutually interlocked fashion, wherein the control unit is provided with an operation data storing means for storing necessary data for operation at each position of the cells installed in the machining section, and a position designating means for designating an after-installation position, and after being installed in the machining section of the automatic machining system, the control unit reads data necessary for operation out of the operation data storing means in accordance with the position designated by the position designating means, wherein the control unit comprises a communication means for establishing communication with other parts of the machining section, and when the control unit establishes packet communication via the communication means, the operation data storing means stores every position of the machining section discrimination data added to the packet at sending side and collation data used for collating the discrimination data at receiving side, for the purpose of 1 to 1 correspondence between the sending side and the receiving side, as necessary data for operation at the each position, and the control unit establishes communication with other parts of the machining section via the communication means by using discrimination data and collation data read out of the operation data storing means in accordance with the position designated by the position designating means.

2. The processing cell of automatic machining system of claim 1, wherein discrimination data and collation data stored in the operation data storing means as necessary data for operation at each position are numeric value data.

3. The processing cell of automatic machining system of claim 2, wherein the communication means establishes communication via a loop-form communication line, and up information and down information common to communication in the machining section are set by numeric values in the control unit, and the up information or down information is added to discrimination data for data transfer, and thereby, one discrimination data is jointly used for both up-going and down-going communication.

4. The processing cell of automatic machining system of claim 2, wherein discrimination data and collation data stored in the operation data storing means as necessary data for operation at each position are represented as functional values of which position numbers designated by the position designating means are variables.

5. The processing cell of automatic machining system of claim 1,
wherein discrimination data and collation data stored in the operation data storing means as necessary data for operation at each position are represented by character codes.

6. The processing cell of automatic machining system of claim 1,
wherein the communication means establishes communication via a loop-form communication line, and
the position designating means for designating the position after being installed in the machining section, receiving a packet having a numbering instruction and number portion, takes in the numeric value contained in the number portion as the position designating number of its own, and adds a predetermined number to the number portion and sends it to the next stage.

7. The processing cell of automatic machining system of claim 1,
wherein a measuring device for measuring machining sizes of work machined by the machine tool is connected to the control unit, and
the control unit transmits the machining sizes of machined work measured by the measuring device to other parts of the machining section via the communication means through packet communication using the discrimination data and the collation data.

8. The processing cell of automatic machining system of claim 1,
wherein a measuring device for measuring machining sizes of work machined by the machine tool is connected to the control unit, and also,
a comparative computing means for making judgment from the measured values of the measuring device is disposed in the control unit, and the result of judgment is transmitted by packet communication using the discrimination data and the collation data to other parts of the machining section via the communication means.

9. A processing cell of automatic machining system, configuring a machining section of an automatic machining system wherein work is continuously carried at predetermined intervals along a work carrying passage and sequentially continuously machined,
which is installed in the machining section of the automatic machining system in quantity adjustable fashion, having a unit structure including at least a carrying device forming a part of the work carrying passage, a single machine tool, and a control unit for controlling these in mutually interlocked fashion,
wherein the control unit is provided with an operation data storing means for storing necessary data for operation at each position of the cells installed in the machining section, and a position designating means for designating an after-installation position, and
after being installed in the machining section of the automatic machining system, the control unit reads data necessary for operation out of the operation data storing means in accordance with the position designated by the position designating means,
wherein the carrying device is structurally capable of changing the normal and reverse directions of work flow.

10. An automatic honing system for executing sequentially continuous honing on work carried at predetermined intervals along the work carrying passage by means of a plurality of honing machines disposed halfway in the work carrying passage for carrying the work,
wherein a honing section for executing honing on work is at least configured in that honing cells for executing honing on work are quantity-adjustably arranged and, also, the plurality of honing cells are driven and controlled in mutually interlocked fashion;
the honing cell is of unit structure including at least a carrying device forming a part of the work carrying passage, a single honing machine, and a control unit for controlling these in mutually interlocked fashion;
the control unit of the honing cell is provided with an operation data storing means for storing every position necessary data for operation at each position of the cells installed in the honing section, and a position designating means for designating an after-installation position; and
after being installed in the honing section of the automatic honing system, the control unit reads necessary data for operation out of the operation data storing means in accordance with the position designated by the position designating means,
wherein each control unit comprises a communication means for establishing communication between the control units, and
when the control unit establishes packet communication via the communication means, the operation data storing means stores every position of the honing section discrimination data added to the packet at the sending side and collation data used for collating the discrimination data at the receiving side, for the purpose of 1 to 1 correspondence between the sending side and the receiving side, as necessary data for operation at each position, and
the control unit establishes communication between the control units via the communication means by using discrimination data and collation data read out of the operation data storing means in accordance with the position designated by the position designating means.

11. The automatic honing system of claim 10,
wherein discrimination data and collation data stored in the operation data storing means as necessary data for operation at each position are numeric value data.

12. The automatic honing system of claim 11,
wherein the communication means establishes communication via a loop-form communication line, and
up information and down information common to communication in the honing section are set in each control unit, and the up information or down information is added to discrimination data for data transfer, and thereby, one discrimination data is used for both up and down communication.

13. The automatic honing system of claim 11,
wherein discrimination data and collation data stored in the operation data storing means as necessary data for operation at each position are represented as functional values of which position numbers designated by the position designating means are variables.

14. The automatic honing system of claim 10,
wherein discrimination data and collation data stored in the operation data storing means as necessary data for operation at each position are represented by character codes.

15. The automatic honing system of claim 10,
wherein the communication means establishes communication via a loop-form communication line, and
the position designating means for designating the position after being installed in the honing section, receiving a packet comprising a numbering instruction and number portion, takes in the numeric value contained in the number portion as the position designating number of its own, and adds a predetermined number to the number portion and sends it to the next stage.

16. The automatic honing system of claim 10, wherein a measuring device for measuring machining sizes of work machined by the machine tool is connected to the control unit, and the control unit transmits the machining sizes of machined work measured by the measuring device to other parts of the honing section via the communication means through packet communication using the discrimination data and the collation data.

17. The automatic honing system of claim 16, wherein a measuring device for measuring machining sizes of work machined by the machine tool is connected to the control unit, and also, a comparative computing means for judgment from the measured values of the measuring device is disposed in the control unit, and the result of judgment is transmitted by packet communication using the discrimination data and the collation data to other parts of the honing section via the communication means.

18. An automatic honing system for executing sequentially continuous honing on work carried at predetermined intervals along the work carrying passage by means of a plurality of honing machines disposed halfway in the work carrying passage for carrying the work, wherein a honing section for executing honing on work is at least configured in that honing cells for executing honing on work are quantity-adjustably arranged and, also, the plurality of honing cells are driven and controlled in mutually interlocked fashion;

the honing cell is of unit structure including at least a carrying device forming a part of the work carrying passage, a single honing machine, and a control unit for controlling these in mutually interlocked fashion;

the control unit of the honing cell is provided with an operation data storing means for storing every position necessary data for operation at each position of the cells installed in the honing section, and a position designating means for designating the after-installation position; and after being installed in the honing section of the automatic honing system, the control unit reads necessary data for operation out of the operation data storing means in accordance with the position designated by the position designating means, wherein a loading cell forming a work loading section, a plurality of the honing cells, and an unloading cell forming a work unloading section are arranged in series fashion, and the work carrying passage is linearly disposed.

19. The automatic honing system of claim 18, wherein the loading cell is of unit structure including at least a carrying device forming a part of the work carrying passage.

20. The automatic honing system of claim 18, wherein the unloading cell is of unit structure including at least a carrying device forming a part of the work carrying passage.

21. An automatic honing system for executing sequentially continuous honing on work carried at predetermined intervals along the work carrying passage by means of a plurality of honing machines disposed halfway in the work carrying passage for carrying the work, wherein a honing section for executing honing on work is at least configured in that honing cells for executing honing on work are quantity-adjustably arranged and, also, the plurality of honing cells are driven and controlled in mutually interlocked fashion;

the honing cell is of unit structure including at least a carrying device forming a part of the work carrying passage, a single honing machine, and a control unit for controlling these in mutually interlocked fashion;

the control unit of the honing cell is provided with an operation data storing means for storing every position necessary data for operation at each position of the cells installed in the honing section, and a position designating means for designating an after-installation position; and after being installed in the honing section of the automatic honing system, the control unit reads necessary data for operation out of the operation data storing means in accordance with the position designated by the position designating means, wherein the carrying device is structurally capable of changing the normal and reverse directions of work flow.

* * * * *